(12) United States Patent  
Baker

(10) Patent No.: US 9,322,421 B2  
(45) Date of Patent: Apr. 26, 2016

(54) SPRING-LOADED SPLIT-TONGUE CONNECTOR SYSTEM

(71) Applicant: Geoffrey Alan Baker, Sandisfield, MA (US)

(72) Inventor: Geoffrey Alan Baker, Sandisfield, MA (US)

(*) Notice: Subject to any disclaimer, the term of this patent is extended or adjusted under 35 U.S.C. 154(b) by 0 days.

(21) Appl. No.: 14/642,679

(22) Filed: Mar. 9, 2015

(65) Prior Publication Data

US 2015/0176619 A1   Jun. 25, 2015

Related U.S. Application Data

(63) Continuation-in-part of application No. 13/086,424, filed on Apr. 14, 2011, now Pat. No. 9,010,067.

(51) Int. Cl.
| | | |
|---|---|---|
| *E04F 13/08* | (2006.01) | |
| *F16B 5/00* | (2006.01) | |
| *E04F 15/02* | (2006.01) | |

(52) U.S. Cl.
CPC ............. *F16B 5/002* (2013.01); *E04F 13/0894* (2013.01); *E04F 15/02038* (2013.01); *E04F 2201/0115* (2013.01); *E04F 2201/0146* (2013.01); *E04F 2201/042* (2013.01); *E04F 2201/05* (2013.01); *E04F 2201/0517* (2013.01)

(58) Field of Classification Search
CPC . E04F 13/0894; E04F 15/02038; E04F 13/08; E04F 13/0801; E04B 1/38
USPC ............ 52/582.1, 582.2, 588.1, 585.1, 586.1, 52/747.1, 749.11, 749.12, 391; 403/289
See application file for complete search history.

(56) References Cited

U.S. PATENT DOCUMENTS

| | | | | |
|---|---|---|---|---|
| 3,731,445 A | * | 5/1973 | Hoffmann | E04F 15/02 52/391 |
| 4,169,688 A | * | 10/1979 | Toshio | E01C 5/005 404/40 |
| 4,599,841 A | * | 7/1986 | Haid | E04F 15/02005 52/396.04 |
| 5,950,389 A | * | 9/1999 | Porter | E04B 1/6145 403/DIG. 15 |
| 6,675,545 B2 | * | 1/2004 | Chen | B29C 47/0028 403/298 |
| 6,729,091 B1 | * | 5/2004 | Martensson | E04F 15/04 446/112 |
| 6,763,643 B1 | * | 7/2004 | Mårtensson | E04F 15/02 52/403.1 |
| 6,966,161 B2 | * | 11/2005 | Palsson | B44C 3/123 404/41 |
| 7,021,019 B2 | * | 4/2006 | Knauseder | E04F 13/10 24/297 |
| 7,677,005 B2 | * | 3/2010 | Pervan | B27F 1/02 52/582.1 |
| 7,866,111 B2 | * | 1/2011 | Johansson | E04F 15/02 52/391 |
| 7,908,816 B2 | * | 3/2011 | Grafenauer | E04F 13/10 52/471 |
| 2004/0139676 A1 | * | 7/2004 | Knauseder | E04F 15/02 52/578 |

* cited by examiner

*Primary Examiner* — Beth Stephan

(57) ABSTRACT

A connector system for mechanically connecting two structural elements to each other, consisting of a connector element and mating grooves in each structural element. The connector element is comprised of a base plate having a split-tongue element at each side or end of said base plate. Each joined element has a mating groove formed into its connector-receiving surface. The mating groove is designed to allow fabrication via four sequential circular saw cuts, without loss of saleable decorative surface, and at a rate consistent with economical commercial production of vinyl, laminate, or hardwood flooring. The connector element is readily extruded in a variety of polymers, including PVC. The connector and mating grooves interact so as to generate a force component acting to forcibly draw the connector into the mating grooves. The connector system operation is relatively insensitive to geometric deviations associated with normal manufacturing methods.

16 Claims, 22 Drawing Sheets

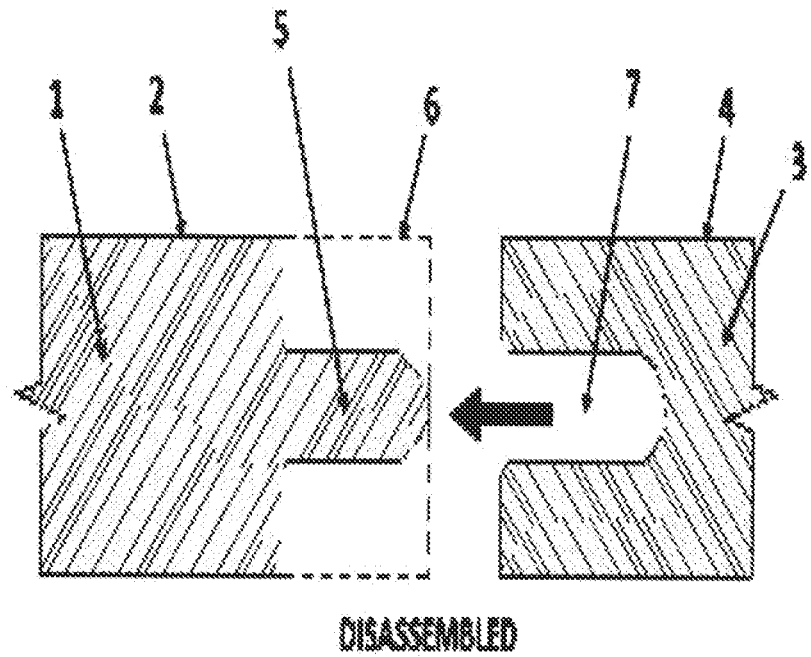
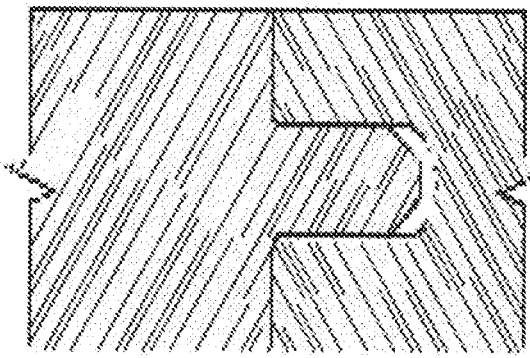
FIG. 1
(PRIOR ART)

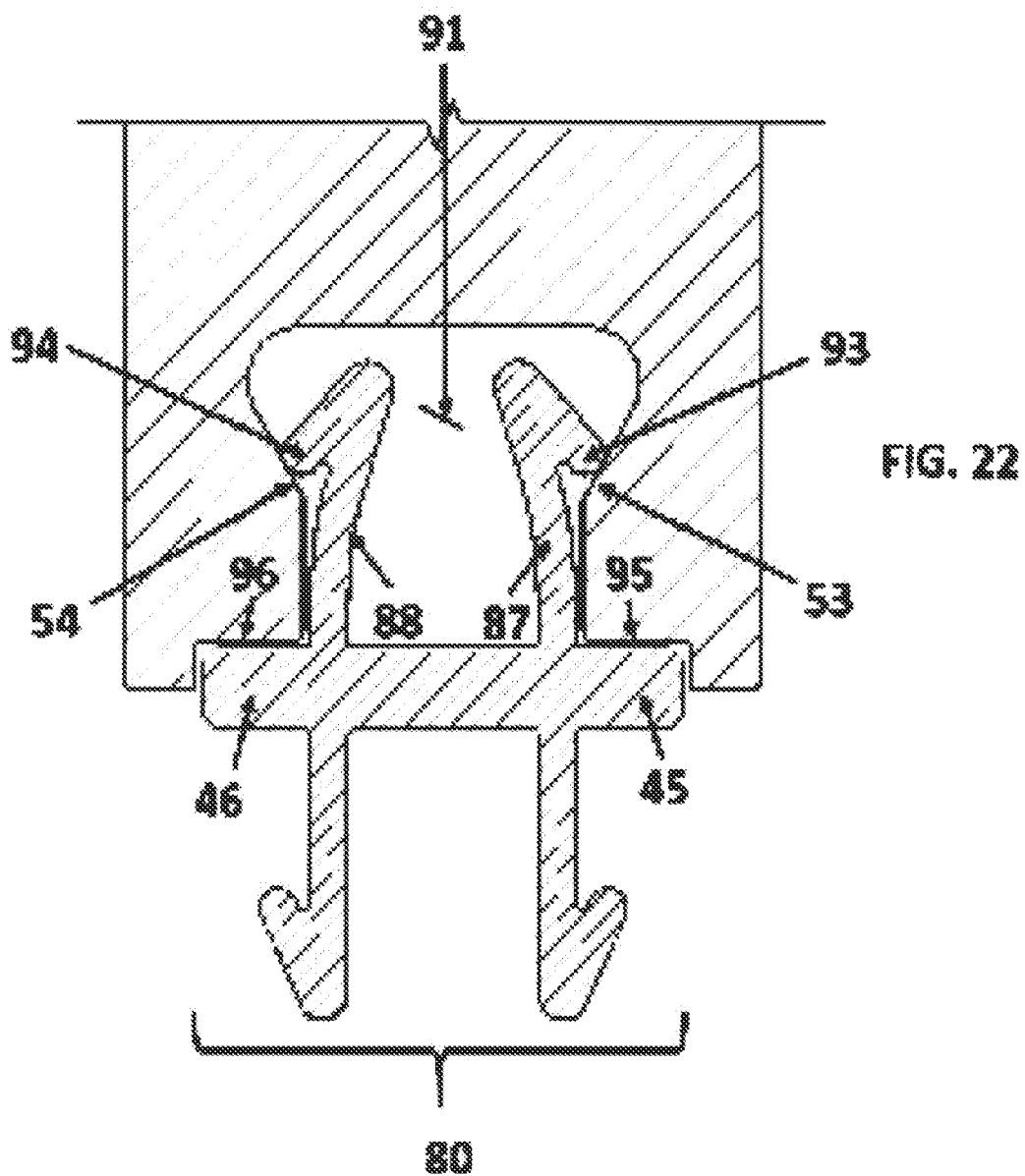

SPRING-LOADED SPLIT-TONGUE CONNECTOR SYSTEM

CROSS-REFERENCE

This is a continuation-in-part Application to the U.S. application Ser. No. 13/086,424, filed on Apr. 14, 2011, from which priority is claimed, and entirety of which is hereby incorporated by reference.

BACKGROUND OF INVENTION

1. Field of Invention

This invention relates to a connector system for mechanically joining building panels (such as vinyl, laminate, or hardwood flooring); mechanically attaching decorative items (such as wall panels, ceiling panels, or automotive trim); mechanically attaching subsystems (such as automotive dashboards); or mechanically connecting elements of ready-to-assemble furniture.

2. Description of Related Art

FIG. 1 is a schematic drawing of the ubiquitous tongue and groove joining system typically used to join structural elements such as hardwood flooring. In the figure, hardwood flooring substrate element 1 with decorative surface 2 is to be connected to hardwood flooring substrate element 3 with decorative surface 4. A solid tongue 5 is machined from the solid substrate material with the resultant loss of saleable decorative surface 6. A mating groove 7 is formed in substrate element 3 to accept tongue 5. The structural elements are joined by moving element 3 in the direction of the arrow so as to cause mating groove 7 to receive tongue 5. The tongue is normally forcibly received into its mating groove and once received, the tongue, though held in place by friction, is not actively drawn into the groove Additional prior art is found in U.S. patent application Ser. No. 12/705,593, EFS ID 7006498 of Baker and Vitale which discloses a method for "Laying and Mechanically Joining Building Panels or Construction Elements". The mating groove described in this patent application is shown in FIG. 2. The Baker/Vitale patent application describes a system that is similar to that of the present patent application but differs in the following two significant ways:

1. The locking steps located at the distal end of the Baker/Vitale mating groove can only be fabricated using a device such as a rotary router cutter or a linear broach cutter, neither of which are consistent with high speed commercial flooring production.
2. The connector and mating groove interaction in the Baker/Vitale system is more sensitive to geometric deviations arising from manufacturing tolerances.

The differences noted above are a consequence of the mating groove geometry associated with the Baker/Vitale patent application. As seen in FIG. 2, the mating groove 27 has steps 8 and 9 near its distal end. These steps are intended to interact with catches on a mating split-tongue connector in such a manner as to forcibly draw the connector into the groove.

As shown in FIG. 2, a hold region extension line 10 drawn parallel to step 8 does not exit the groove through the groove entrance region 11 but rather intersects the opposite sidewall of the groove at 12. Consequently, steps 8 and 9 must be formed using either a rotary router cutting tool 13 as shown in FIG. 3A, or a linear broach cutting tool 14, as shown in FIG. 3B. As seen in FIG. 3A, the diameter 16 of the router cutting tool is limited to the maximum distance 15 between the outer surfaces of the steps. That is, in contradistinction to the connector system disclosed in this application, the diameter of the rotary cutting tool cannot be made larger than the maximum groove width.

Due to the limited rotary cutter diameter shown in FIG. 3A, the rotary approach is precluded, by tool heating and chip removal considerations, from forming a mating groove at the speeds (i.e., approximately 360 linear feet per minute) consistent with economical production of the thousands of linear feet of groove typically required in commercial vinyl, laminate, or hardwood flooring. The broach approach to groove fabrication shown in FIG. 3B, faces similar heating and chip removal obstacles relative to the same commercial application.

It should be noted, however, that although the rotary router approach is precluded, by economics, from use in high-speed flooring production; it can be used in other commercial applications, such as ready-to-assemble (RTA) furniture, where groove linear dimensions are only 2" to 3" and low-speed groove fabrication is economically viable.

SUMMARY OF INVENTION

The objective of the present invention is to provide a versatile, robust, low cost connector system, suitable for the mechanical joining of two construction elements; having a mating groove geometry that can be formed at a rate required for economical production of vinyl, laminate, or hardwood flooring; and that is also suitable for a wide variety of other less demanding applications, e.g., ready-to-assemble furniture.

The invention comes in two preferred embodiments: a lateral embodiment and a normal embodiment. The advantage of the lateral embodiment relative to the normal embodiment is that, once assembled, the lateral embodiment is completely hidden from view; a feature that is very desirable for ready-to-assemble furniture. Conversely, the normal connector, though visible after assembly, is only visible from the under surface of flooring, its preferred application, and hence, is totally hidden from view by the upper decorative flooring surface. In addition, in a completed floor installation, the normal connector allows the removal of a damaged floor board without damage or intrusion into the floor boards adjoining it. This is because in flooring the direction of board removal must be normal to the flooring surface. Fortunately, in the normal embodiment, this direction is the same as the direction of tongue insertion and retraction, allowing the board to be removed from the tongue without damage to either the tongue, the board groove, or the adjoining boards. This feature has been nicely demonstrated in vinyl flooring hardware.

In ready-to-assemble furniture, unlike flooring, the direction of structural component removal is not restricted to a direction normal to the component decorative surface. Consequently, in ready-to-assemble furniture, the preferred application of the lateral connector; the structural component can almost always be removed from the connector element in a direction parallel to that of tongue insertion and retraction, and hence without damage to the connector tongue or the joined components.

BRIEF DESCRIPTION OF DRAWINGS

Other aspects, features, and advantages of the present invention will become more fully apparent from the following detailed description, the appended claims, and the accompanying drawings in which similar element are given similar reference numerals.

FIG. 1 is a side view of a typical solid tongue and groove connection system

FIG. 22 shows the alternate connector at its full insertion.

DESCRIPTION OF PREFERRED EMBODIMENTS

Figure 4:
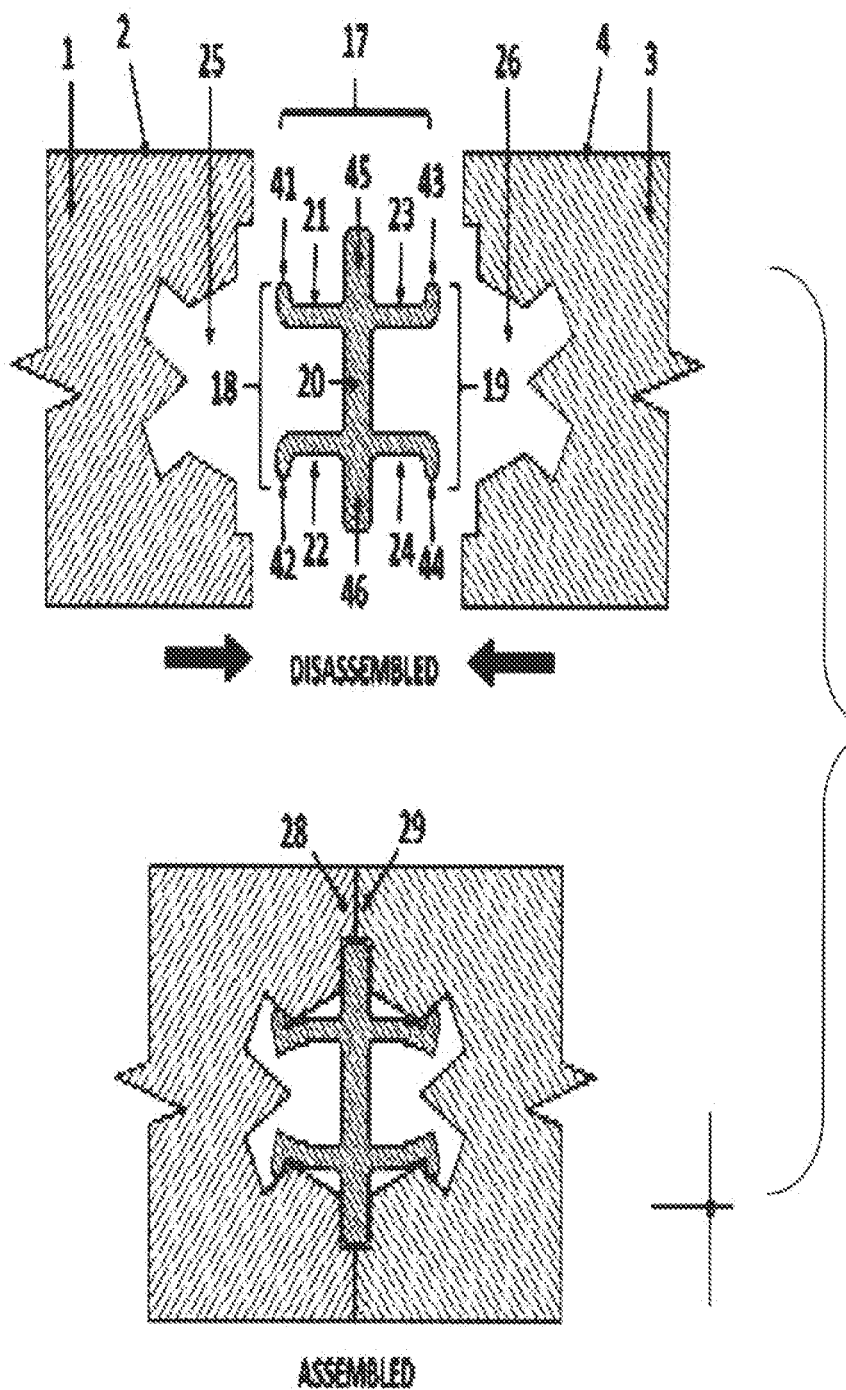
FIG. 4 is a lateral split-tongue connector system used to mechanically join two hardwood floor boards.
Figure 5:
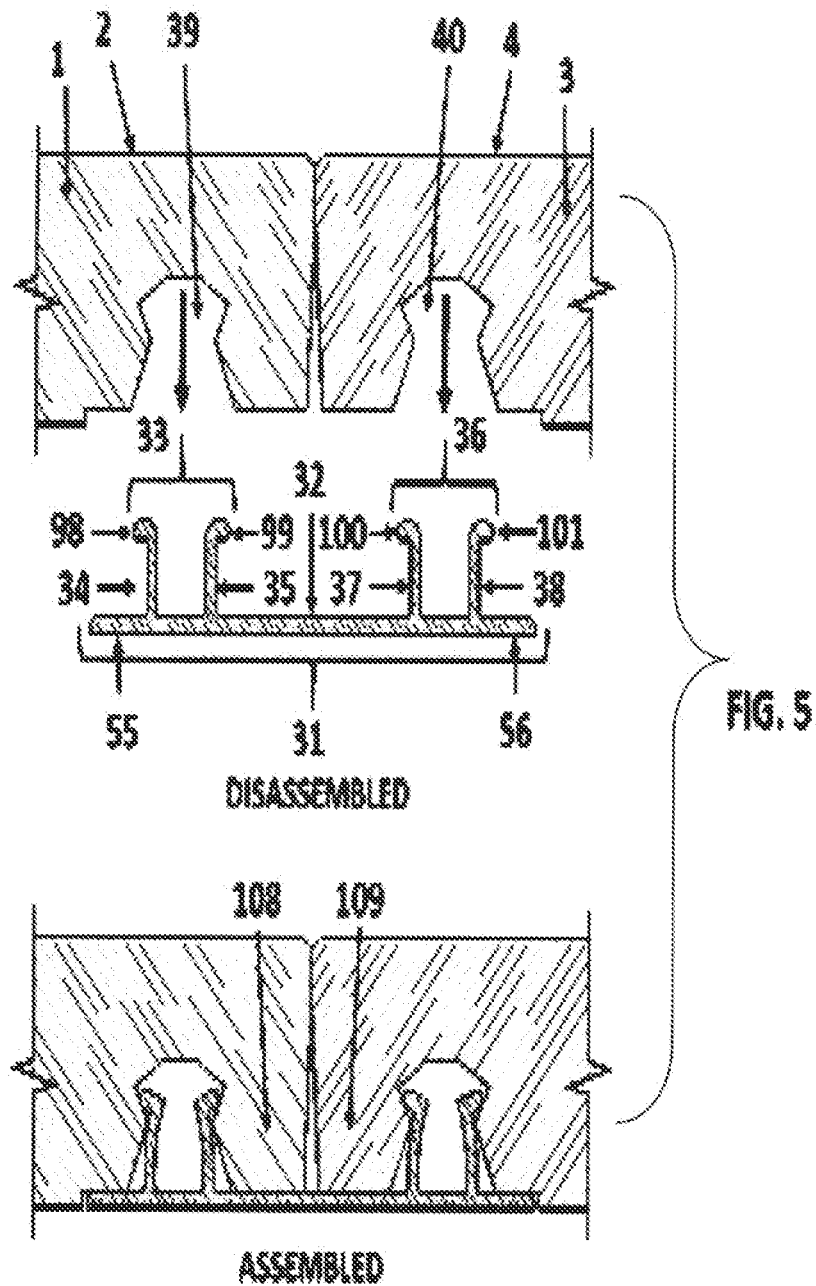
FIG. 5 is a normal split-tongue connector system used to mechanically join two hardwood floor boards.

The connector system disclosed herein has two major preferred embodiments: a lateral connector system embodiment shown schematically in FIG. 4 and a normal connector system embodiment shown schematically in FIG. 5.

The following specification is divided into four sections. The first section, comprising FIGS. 4 and 5 focuses on the structure and fabrication of the connector element of the preferred embodiments (item 17 in FIG. 4 and item 31 in FIG. 5). The second section focuses on the structure and fabrication of the connector mating groove of the preferred embodiments and comprises FIGS. 6, 7, and 8. The third section focuses the manner in which the connector element and the mating groove of the preferred embodiments mechanically interact and comprises FIGS. 9 to 18. The fourth and last section focuses on an alternative connector and groove embodiment and comprises FIGS. 19 to 22.

FIG. 4 shows the lateral embodiment of the connector system as used to connect hardwood flooring. The upper detail shows the connector system prior to assembly, and the lower detail shows the assembled system wherein the two floor board elements are mechanically joined by the connector. The arrows in the upper figure show the direction in which the joined elements move relative to the connector during assembly. The descriptor "lateral" in this embodiment indicates that the assembly motion is in a lateral direction, i.e., parallel to the flat upper surfaces of the floor boards and normal to the joined faces.

FIG. 5 shows the normal embodiment of the connector system as used to connect hardwood flooring. The upper detail shows the connector system prior to assembly, and the lower detail shows the assembled system wherein the two floor board elements are mechanically joined by the connector. The arrows in the upper figure show the direction in which the joined elements move relative to the connector during assembly. The descriptor "normal" in this embodiment indicates that the motion of the connector relative the floor boards is normal to the flat upper surfaces of the boards.

In FIG. 4, items 1 and 3 are left and right floor boards respectively, and items 2 and 4 are their respective decorative surfaces. Item 17 is a lateral connector element having left split-tongue element 18 and right split-tongue element 19. The two split-tongues 18 and 19 are formed on either side of base plate 20. The left split-tongue 18 has two flexible arms 21 and 22, and right split-tongue 19 has two flexible arms 23 and 24. The flexible arms 21, 22, 23, and 24 have outward facing nubs 41, 42, 43, and 44 respectively at their distal ends. Left split-tongue 18 mates with groove 25 in left floor board 1 and right split-tongue 19 mates with groove 26 in right floor board 3. Said nubs 41 and 42 contact the side-walls of said mating groove 25 of said split-tongue 18; and said nubs 43 and 44 contact the side-walls of the said mating groove 26 of said split-tongue 19.

The split-tongues 18 and 19 in FIG. 4 are similar to the solid tongue 5 in FIG. 1 in the sense that each split-tongue and each solid tongue mate with one groove. That is, the solid tongue 5 mates with the groove 7 in FIG. 1 and, similarly, the split-tongues 18 and 19 mate with the grooves 25 and 26 respectively in FIG. 4. The solid tongue in FIG. 1, however, differs from the split-tongues in FIG. 4 in that the solid tongue in FIG. 1 is a monolithic and relatively stiff structure, whereas the split-tongues in FIG. 4 is comprised of at least two relatively flexible arms.

In FIG. 5, items 1 and 3 are left and right floor board respectively, and items 2 and 4 are their respective decorative surfaces. Item 31 is a normal connector element having left split-tongue 33 and right split-tongue 36. The two split-tongues 33 and 36 are supported on the left and right sides respectively of base plate 32. The base plate 32 has a left extension 55 and a right extension 56. The left split-tongue 33 has two flexible arms 34 and 35 respectively, and right split-tongue 36 has two flexible arms 37 and 38 respectively. The flexible arms 34, 35, 37, and 38 have outward facing nubs 98, 99, 100, and 101 respectively at their distal ends. The left split-tongue 33 mates with the mating groove 39 in the left floor board 1, and the right split-tongue 36 mates with the mating groove 40 in the right floor board 3.

Figure 6:
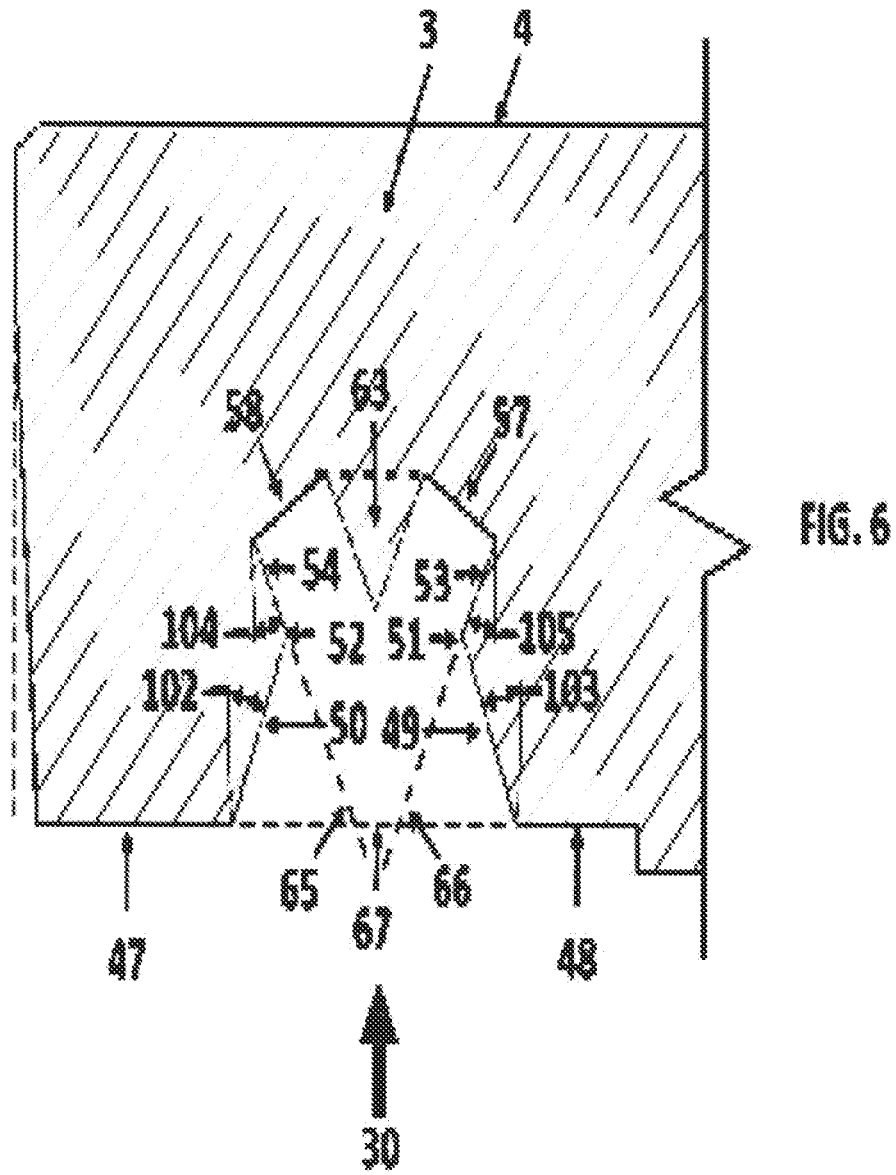
FIG. 6 show the mating groove for a normal connector.

The mating groove design for the normal connector, item 31 in FIG. 5, is shown in FIG. 6. The groove is fabricated into the connector-receiving surface opposite the decorated surface 4 of right floor board 3. The groove consists of five regions arranged sequentially in the direction 30 of tongue insertion into the groove. The first region is a recess region defined by recess upper surfaces 47 and 48. The upper surface 47 of the recess region receives the normal connector base plate 32 and upper surface 48 is receives the base plate extension 56 in FIG. 5. The recess region is followed by an entry region defined by converging sidewalls 49 and 50; an apex region defined by minimum groove width points 51 and 52; a hold region defined by diverging sidewalls 53 and 54; and groove cap or termination region defined by surfaces 57 and 58 and by triangular element 63. The groove sidewall angles are defined as follows: angles 102 and 103 are the left and right entry region convergence angles respectively; and angles 104 and 105 are the left and right hold region divergence angles respectively. The triangular element 63 is part of the groove cap and it may be kept in place or it may be removed with no impact on the operation of the connector system.

In FIG. 6, items 49, 51, and 53 form the right sidewall and items 50, 52 and 54 form the left sidewall of its groove. Similarly, in FIG. 7, items 49, 51, and 53 form the right sidewall and items 50, 52 and 54 form the left sidewall of its groove.

During connector element insertion into its mating groove, the outward facing nubs on the flexible arms contact the converging walls of the mating groove entry region causing the arms to bend or deflect inward. The maximum deflection occurs when the arm nubs reach the groove apex. The maximum arm bending stress occurs this point, and consequently, the groove minimum width at the apex is selected to avoid significant plastic deformation of the flexible arms as they pass the groove apex during split-tongue insertion.

Continued insertion of the tongue past the groove apex causes the nubs to contact the diverging walls of the hold region and the associated arm deflection to decrease. The connector becomes fully inserted into its mating groove when the base plate 32 and its extension 56 in FIG. 5 rest on the groove upper recess surfaces 47 and 48 in FIG. 6. The residual arm deflection, i.e., the split-tongue arm deflection at full insertion, though less than that maximum arm deflection associated with the nubs at the groove apex, is significantly not zero.

The uniform thickness of the normal connector shown in FIG. 5 make the connector amenable to extrusion via a simple flat plate extrusion die.

Figure 7:
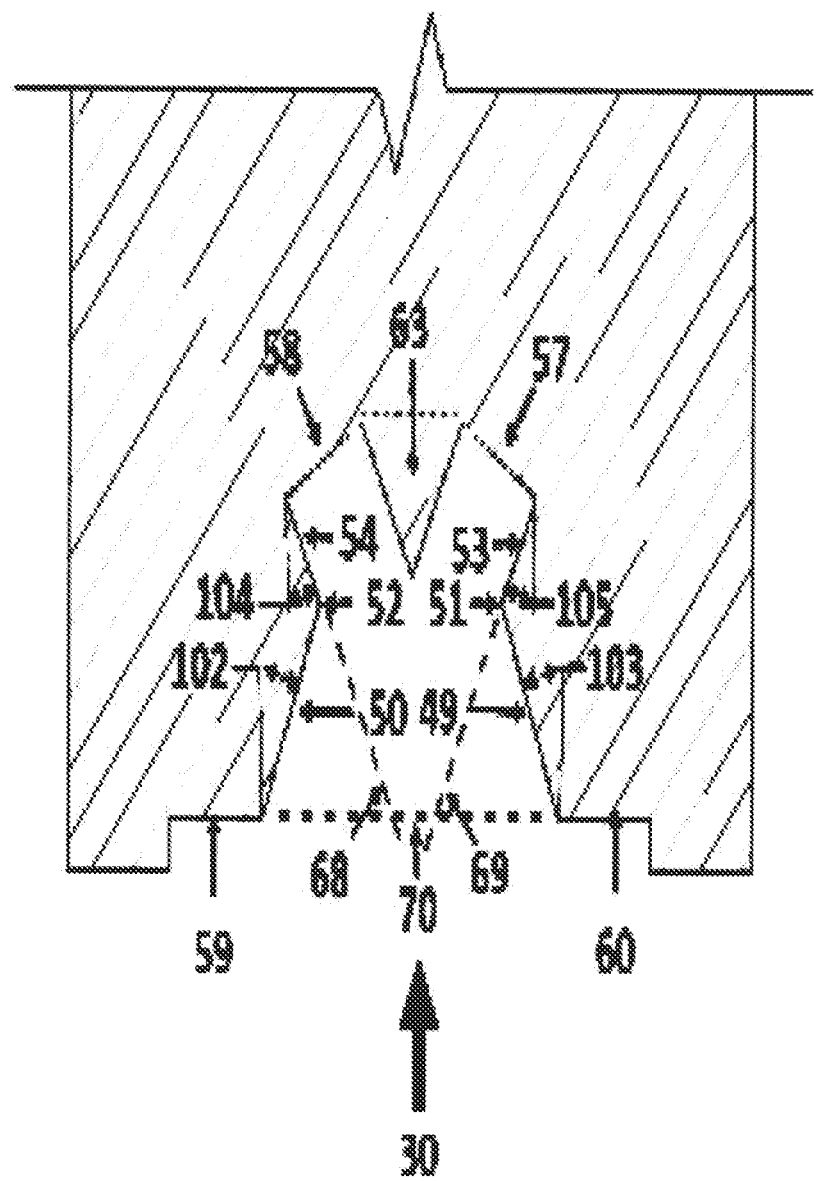
FIG. 7 shows the mating groove for a lateral connector.

The mating groove for the lateral connector, item 17 in FIG. 4, is shown in FIG. 7. The groove is fabricated into the joining surfaces of boards 1 and 3 in FIG. 4. The lateral connector mating groove shown in FIG. 7 consists of five regions arranged sequentially in the direction 30 of tongue insertion into the groove. These regions are: a recess region defined by recess upper surfaces 59 and 60 to accept base plate extensions 45 and 46 in FIG. 4; an entry region defined by converging sidewalls 49 and 50; an apex region defined by minimum groove width points 51 and 52; a hold region defined by diverging sidewalls 53 and 54, and groove cap or termination region 57 and 58, and by triangular element 63. The groove sidewall angles are defined as follows: angles 102 and 103 are the left and right entry region convergence angles respectively; and angles 104 and 105 are the left and right hold region divergence angles respectively. The triangular element 63 is part of the groove cap and it may be kept in place or it may be removed with no impact on the operation of the connector 20 system.

In FIG. 4, the base plate extensions 45 and 46 of base plate 20 serve two functions:
1. limit the extent to which the split-tongue can be drawn into the groove and, hence, set the location of the fully inserted split-tongue past the apex and thereby position the connector element so that residual split-tongue arm deflection is established,
2. provide vertical structural support to those portions 28 and 29 of the floor boards that overhang the connector in FIG. 4.

In FIG. 5, the base plate 32 provides vertical support for those portions 108 and 109 that overhang the normal connector. Base plate 32, in conjunction with base plate extensions 55 and 56 in FIG. 5, act to limit the extent to which the split-tongue can be drawn into its mating groove and, hence, set the location of the fully inserted split-tongue past the apex and thereby position the connector element so that residual split-tongue arm deflection is established.

Figure 2:
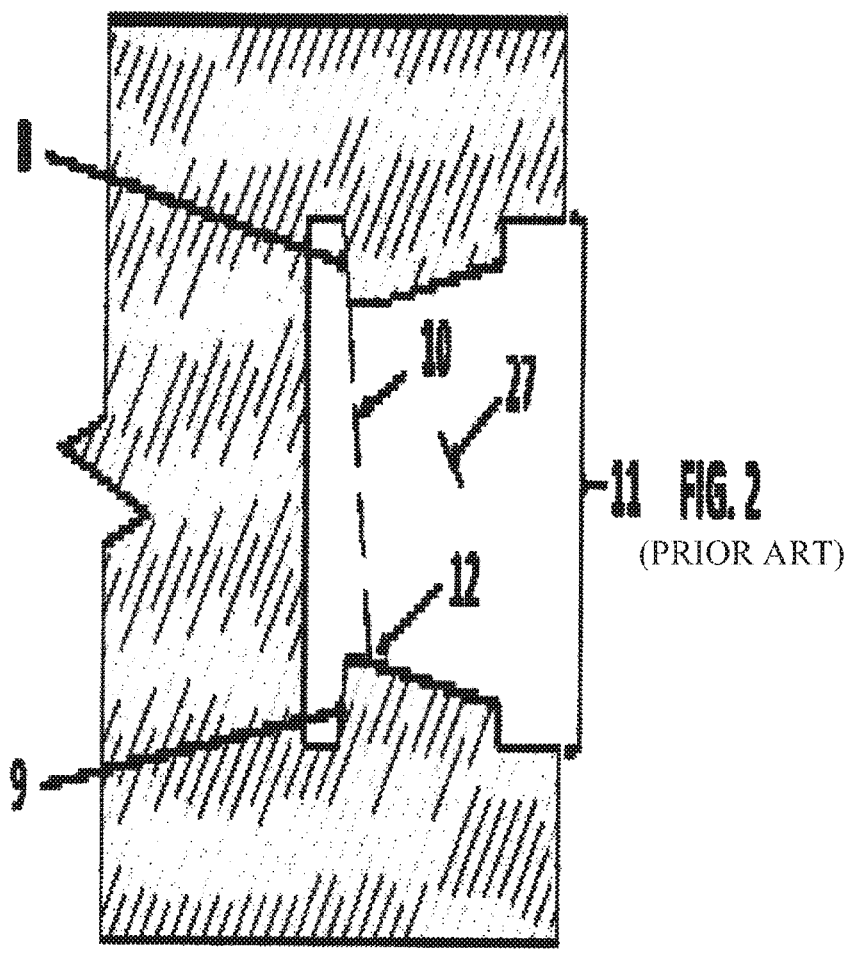
FIG. 2 is a side view of the groove disclosed by Baker and Vitale in U.S. patent application Ser. No. 12/705,593, EFS ID 7006498
Figures 3A, 3B:
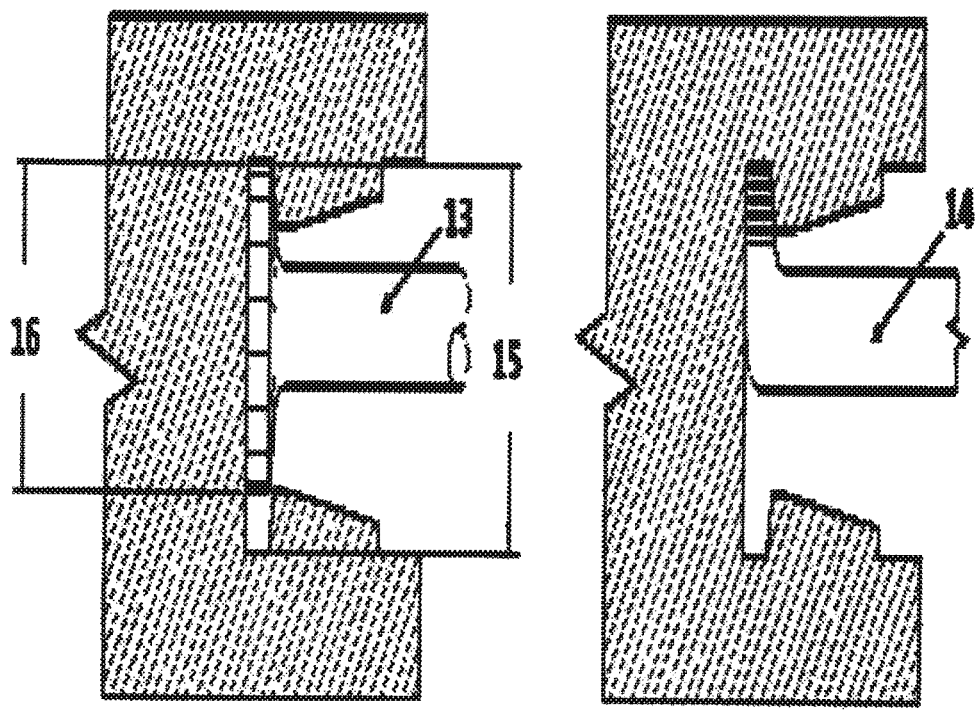
FIG. 3A shows the groove in FIG. 2 being formed using a rotary router cutting tool.
FIG. 3B shows the groove in FIG. 2 being formed using a linear broach cutting tool.
Figure 8:
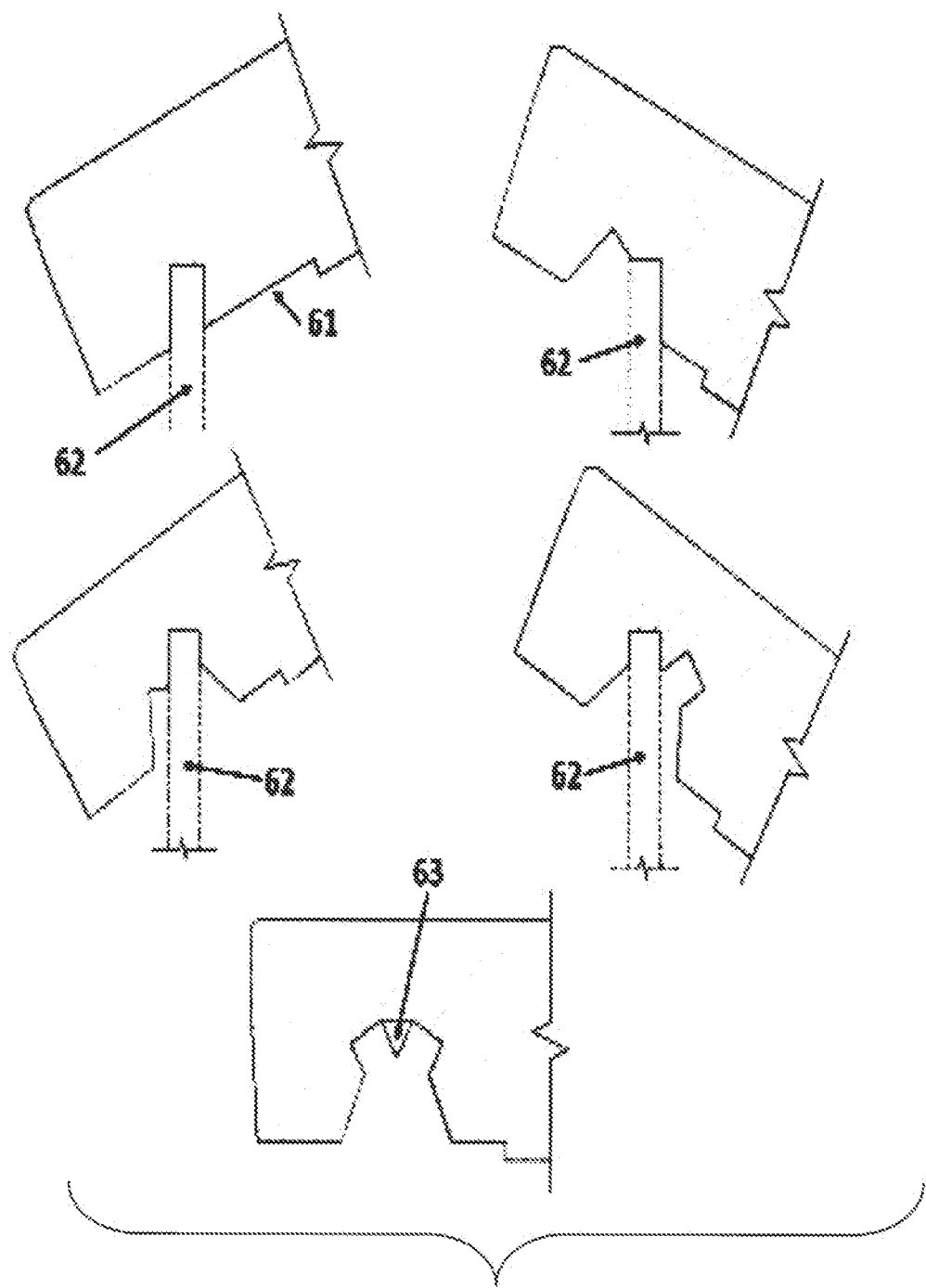
FIG. 8 shows the manner in which the mating groove for a normal connector can be formed by four circular saw cuts.

A key feature of the normal connector groove structure shown in FIG. 6 is that the left hold region extension line 65 of said left hold region sidewall 54; and the right hold region extension line 66 of said right hold region sidewall 53, respectively, pass through said groove entrance 67. Similarly, a key feature of the lateral groove design shown in FIG. 8 is that the left hold region extension line 68 of said hold region sidewall 54; and the right hold region extension line 69 of said left hold region sidewall 53, respectively, pass through said groove entrance 70. In contradistinction to the Baker and Vitale groove shown in FIG. 2, this allows both grooves to be fabricated using cutters with a cutter diameter greater than the corresponding maximum groove width. That is, with a high-speed cutter such as a circular saw.

FIG. 8 shows how, subsequent to cutting the base plate recess region 61, the remainder of the groove can be fabricated via four sequential circular saw cuts made via circular saw blade 62. The first and second saw cuts are shown in the left and right figures in the upper detail. The third and fourth saw cuts are shown in the left and right figures in the middle detail. The resulting final groove shape is shown in the single detail at the bottom of the figure.

For each saw cut, FIG. 8 shows the saw location relative to the floor board and the resulting groove geometry. Though shown in a particular sequential order in FIG. 8, these four saw cuts can, actually, be performed in any sequential order. The ability to form the groove using a series of sequential high-speed circular saw cuts is a key feature in allowing the grooves to be fabricated at a linear cutting speed that is high enough for economical flooring production.

Figure 9:
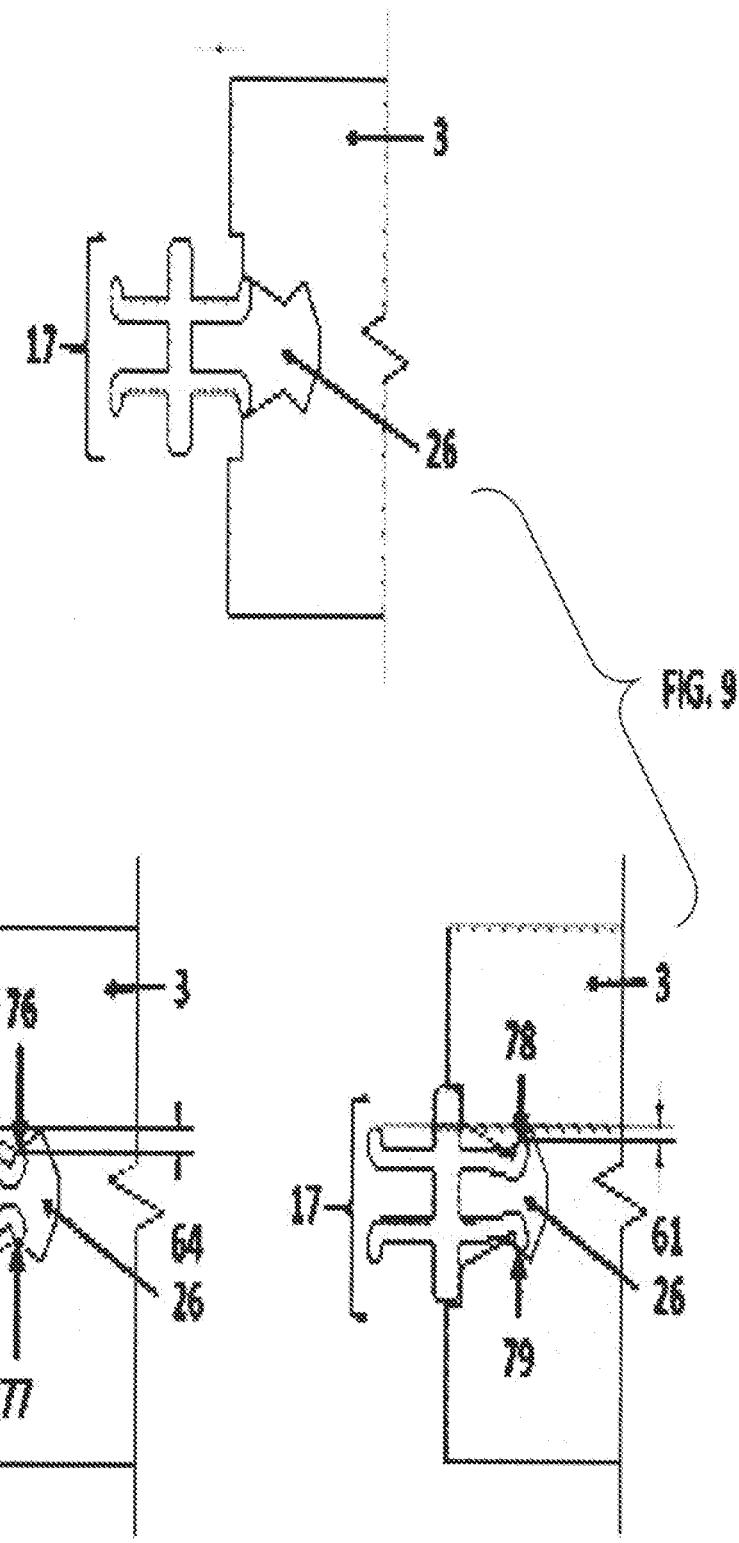
FIG. 9 shows a lateral split-tongue connector at three significant locations during installation into its mating groove: at the beginning of installation with no arm deflection; with the flexible arm nubs at the groove apex with maximum arm deflection; and with the split-tongue fully inserted with residual arm deflection.

FIG. 9 shows said lateral connector 17 of FIG. 4 at three significant locations during split-tongue insertion into said mating groove 26. The upper detail in FIG. 9 shows the lateral connector 17 and mating groove 26 at the beginning of insertion of the split-tongue into the said mating groove of left floor board 3. At that point, no arm deflection has been induced by the interaction of the flexible arm nubs with the mating groove sidewall; and, hence, no deflection force is applied to the arms by the groove side walls. The lower left detail in FIG. 9 shows said connector 17 inserted into said mating groove 26 to the point where the split-tongue flexible arm nubs are in contact with the groove apex. The arms are now deflected in response to forces applied to the arm nubs by the groove sidewalls. The arm deflection 64 is at its maximum value in response to the maximum arm deflecting forces 76 and 77. The lower right detail in FIG. 9 shows the connector 17 at full insertion into its mating groove 26. At full insertion the only intended contact between the flexible arm and the groove is where the nubs contact the hold ramp, the flexible arms should not contact the apex region after full insertion. The corresponding fully inserted arm deflection forces, 78 and 79, are less than the maximum arm deflection forces 76 and 77 respectively. It should be noted, however, that the fully inserted arm deflection 61, though less than the maximum arm deflection 64, is significantly not zero; and consequently, the full insertion arm deflection forces 78 and 79, though less than the maximum arm deflection forces, 76 and 77, are similarly, significantly not zero. This is a defining feature of the lateral connector and the mating groove structure.

Figure 10:
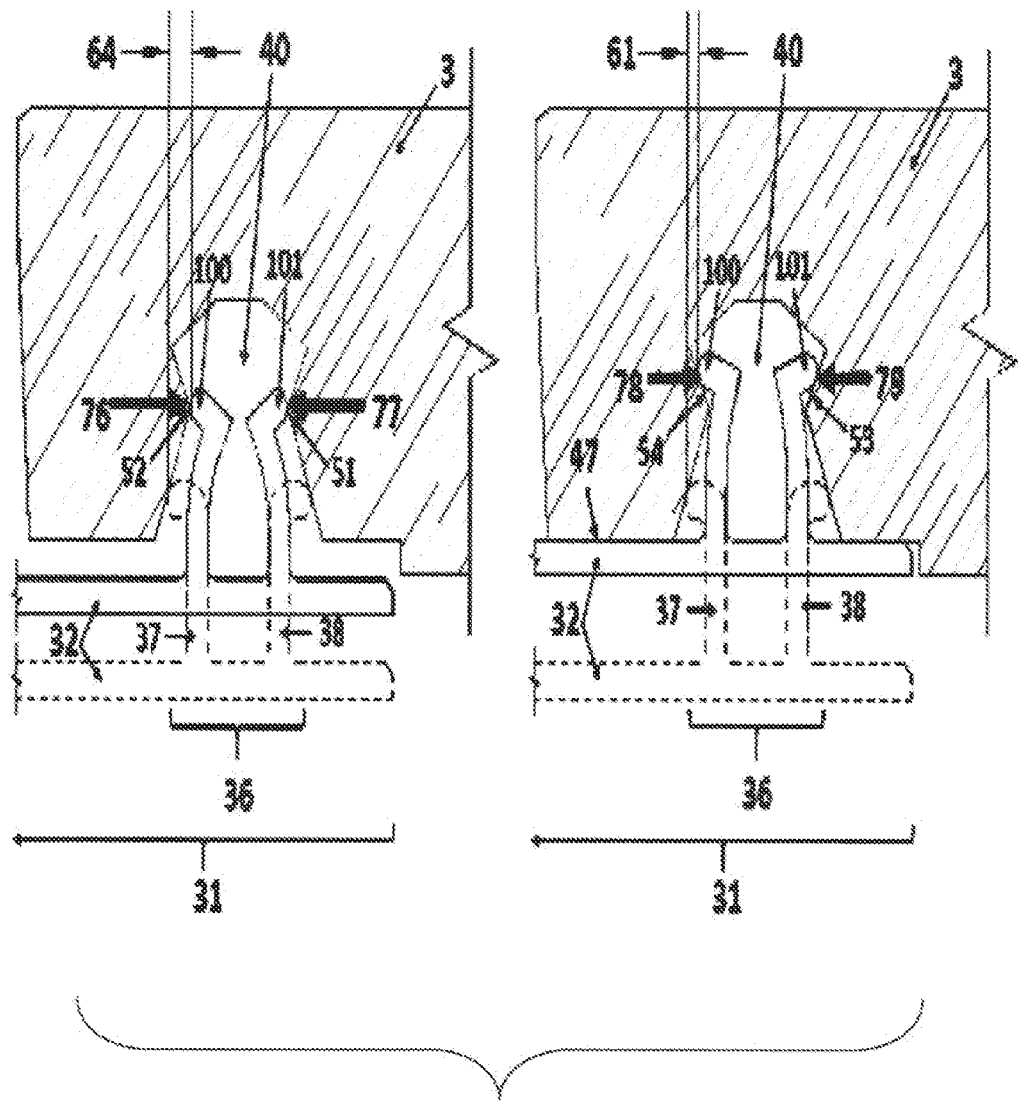
FIG. 10 shows a normal split-tongue connector at two significant locations during installation into its mating groove: with the flexible arm nubs at the groove apex with maximum arm deflection; and with split-tongue fully inserted with residual arm deflection. In each case a dashed outline shows the location of the split-tongue at the beginning of installation with zero arm deflection.

FIG. 10 shows two significant locations of the right side of normal connector 31 during insertion into its mating groove 40. The dotted outlines in the left and right details of FIG. 10 show the shape and location of split-tongues 36 just prior to full insertion into mating groove 40. The solid outline in the left detail of FIG. 10 shows the split-tongue 36 inserted into mating groove 40 to the point where the left and right nubs 100 and 101 respectively on left and right flexible arms 37 and 38 respectively, are in contact with the left and right apex points 52 and 51 respectively of mating groove 40. The solid outline in the right detail of FIG. 10 shows the connector 31 fully inserted into mating groove 40 at which point the left and right nubs 100 and 101 respectively on left and right flexible arms 37 and 38 respectively, of split-tongue 36 are in contact with the left and right hold ramp sidewalls 53 and 54 respectively, of mating groove 40; and the upper surface support base 32 of connector 31 is in contact with the upper recess surfaces 47 and 48 of mating groove 40. It is important to note that the flexible arms are intended to not make contact with the groove apex region.

The left and right flexible arms 37 and 38 respectively in FIG. 10 are deflected inward in response to forces applied to them by the groove sidewalls. In the left detail of FIG. 10, the arm deflection 64 is at its maximum value, and the corresponding arm deflecting forces 76 and 77 are at their maximum values, when the left and right nubs 100 and 101 respectively are at the left and right groove apex points 52 and 51 respectively. The right detail in FIG. 10 shows the connector 31 at full insertion into mating groove 40. The left and right nubs 100 and 101 respectively are now in contact with left and right hold ramps 54 and 53 respectively. The corresponding fully inserted arm deflection forces, 78 and 79, are less than the maximum arm deflection forces 76 and 77 respectively. It should be noted, that the fully inserted arm deflection 61, though less than the maximum arm deflection 64, is significantly not zero; and consequently, the full insertion arm deflection forces 78 and 79, though less than the maximum arm deflection forces 76 and 77, are similarly, significantly not zero. This is a defining feature of the normal connector and the mating groove structure.

Figure 11:
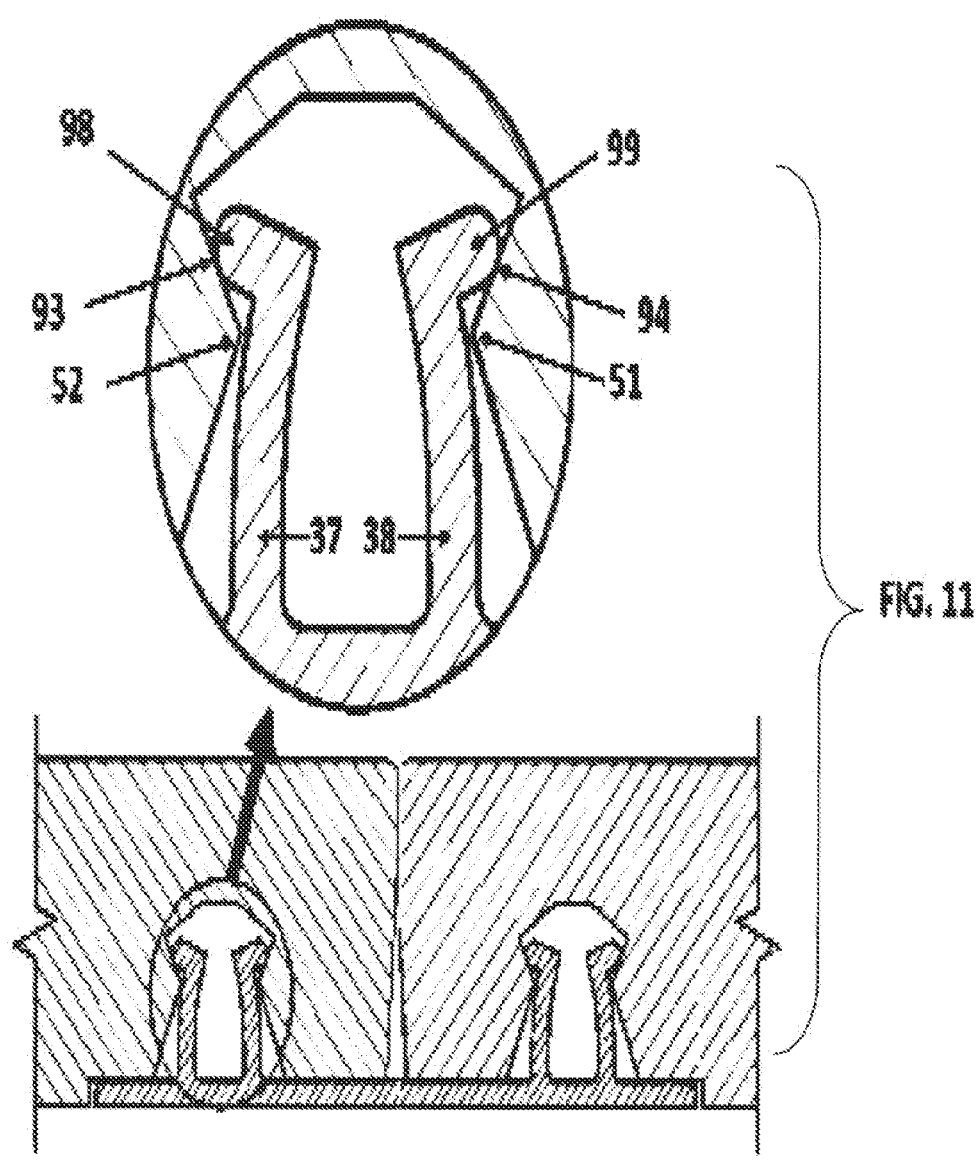
FIG. 11 shows details of the geometric relationship between the split-tongue arms and the mating groove hold region when the split-tongue is fully inserted into its mating groove.

The geometric interaction between the groove sidewalls and the split-tongue arms is an important feature of the present connector system. As seen in FIG. 11, the length of split-tongue arm nubs 98 and 99 is selected so that, at full tongue insertion, contact between the split-tongue arms 37 and 38 and the mating groove sidewall occurs only via nubs 98 and 99 at points 93 and 94 within the diverging or hold region of the groove, and not at the groove apex points 51 and 52 or at any other location along the length of the flexible arms.

Figure 12:
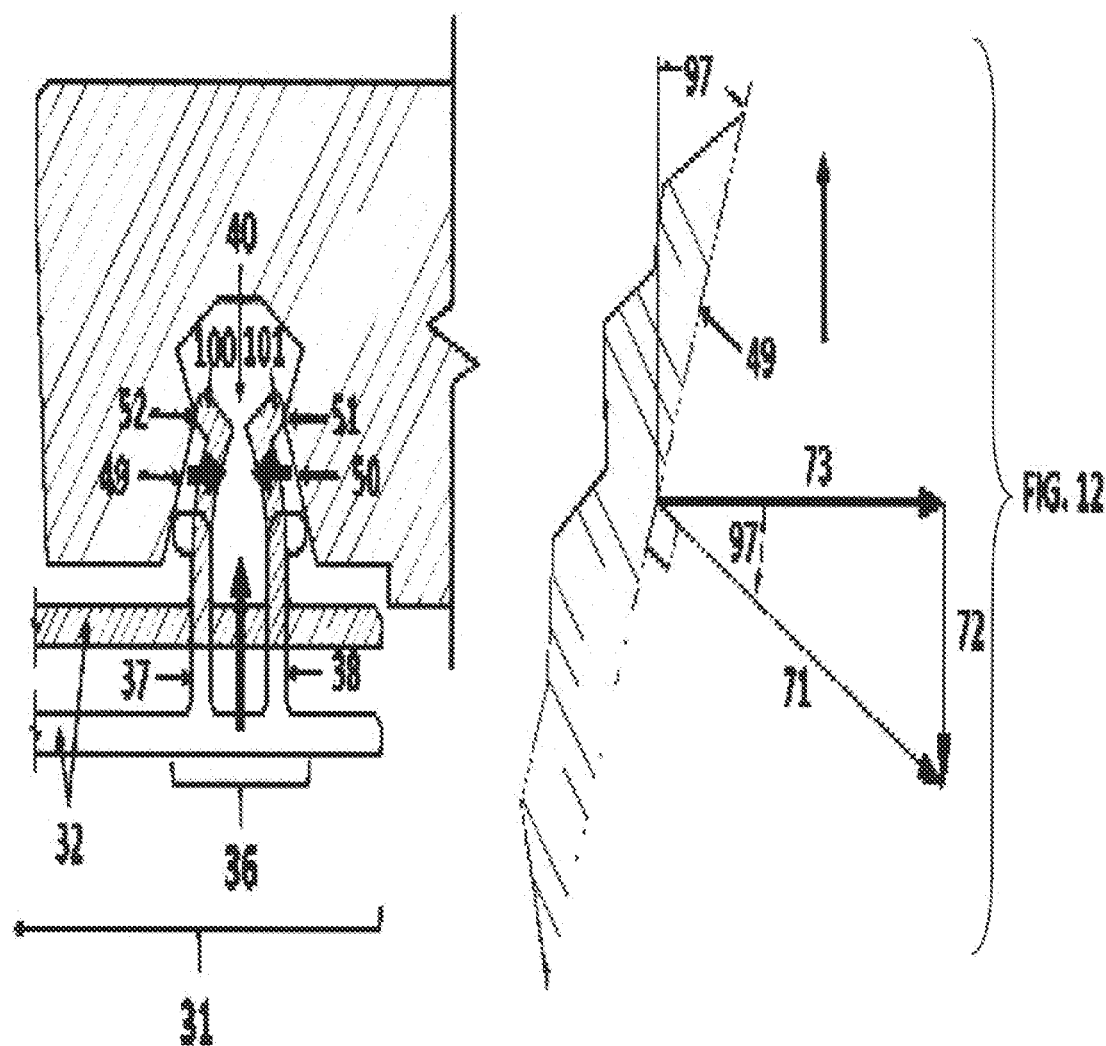
FIG. 12 shows the force components acting on a split-tongue flexible arm nub due to the interaction of the nub with the groove entry region as a normal connector moves into its mating groove in the absence of friction.

The mechanical interaction between the entry region converging groove sidewalls and the split-tongue flexible arms is an important feature of the present connector system. The left detail in FIG. 12 shows the right side of a normal connector 31 with split-tongue 36 protruding upward from base support 32, as said split tongue moves into its mating groove 40, in the direction of the vertical arrow, from the beginning-of-insertion location (shown by the unshaded connector outline) to the apex-location (shown by the shaded connector outline) where the left and right nubs 100 and 101 respectively contact left and right apexes 52 and 51 respectively of said mating groove. In this detail, the entry region left and right converging sidewalls, 50 and 49, respectively, of mating groove 40 act to deflect the left and right flexible arms 37 and 38 of split-tongue 36 inwardly (in the direction of the horizontal arrows respectively) as connector element 31 moves into mating groove 40.

The right detail of FIG. 12, shows in vector format, and in the absence of sidewall-to-nub friction, the force 71 and the force components 72 and 73 imposed on the left flexible arm 37 of split-tongue 36 via nub 100 when said nub is in contact with converging sidewall 49 of said mating groove converging entry region. In the absence of friction, the force 71 is, of necessity, normal to the groove left sidewall surface 49. Since said left sidewall surface corresponds to the entry region of said groove, angle 97 is negative and corresponds to a converging channel. The force vector 71 acting on the nub is shown decomposed into two orthogonal vector components: a vertically directed force component 72 acting opposite the direction of tongue insertion, and a horizontally directed force component 73 acting normal to the direction of tongue insertion. Force 73 is the force responsible for the inward deflection of the split-tongue left flexible arm 37. Force component 72 acts in a direction opposite that of split-tongue insertion and, hence, tends to resist entry of the split-tongue 36 into its mating groove 40.

Since, in the right detail of FIG. 12, the entrance resisting force component 72 acts only on left nub 100 of flexible arm 37 of split-tongue 36, and since said split-tongue has a second, essentially identical, flexible arm 38, the total force resisting insertion of said split-tongue into said mating groove is twice the magnitude of force 72. The condition of zero friction and a −25° value of sidewall angle 97 corresponds to Point A in FIG. 18 and the corresponding force resisting insertion of the split-tongue into the groove is 0.933 times the value of arm deflection force 73. The arm deflection force 73 is zero at said beginning-of-insertion location and increases monotonically as the split-tongue moves from that location to said apex-location. Consequently, the force resisting split-tongue insertion of the split-tongue similarly increases monotonically from zero force to its maximum value as the split-tongue moves from said beginning-of-insertion to said apex location.

A frictionless force interaction between said mating groove sidewall 49 and said left flexible arm nub 100 in FIG.

12 cannot be achieved in practice and, consequently, the effect of friction on the sidewall-to-nub forces must be taken into account. In the following, as typically done, the friction effect is addressed in terms of an associated friction coefficient. That is, the magnitude of the sidewall friction force 74 acting on the flexible arm nub 100 is given by the product of said friction coefficient and the sidewall surface normal force 71, and the friction force acts parallel to the sidewall surface and in the direction that opposes the sliding motion of the nub along the sidewall surface.

Figure 13:
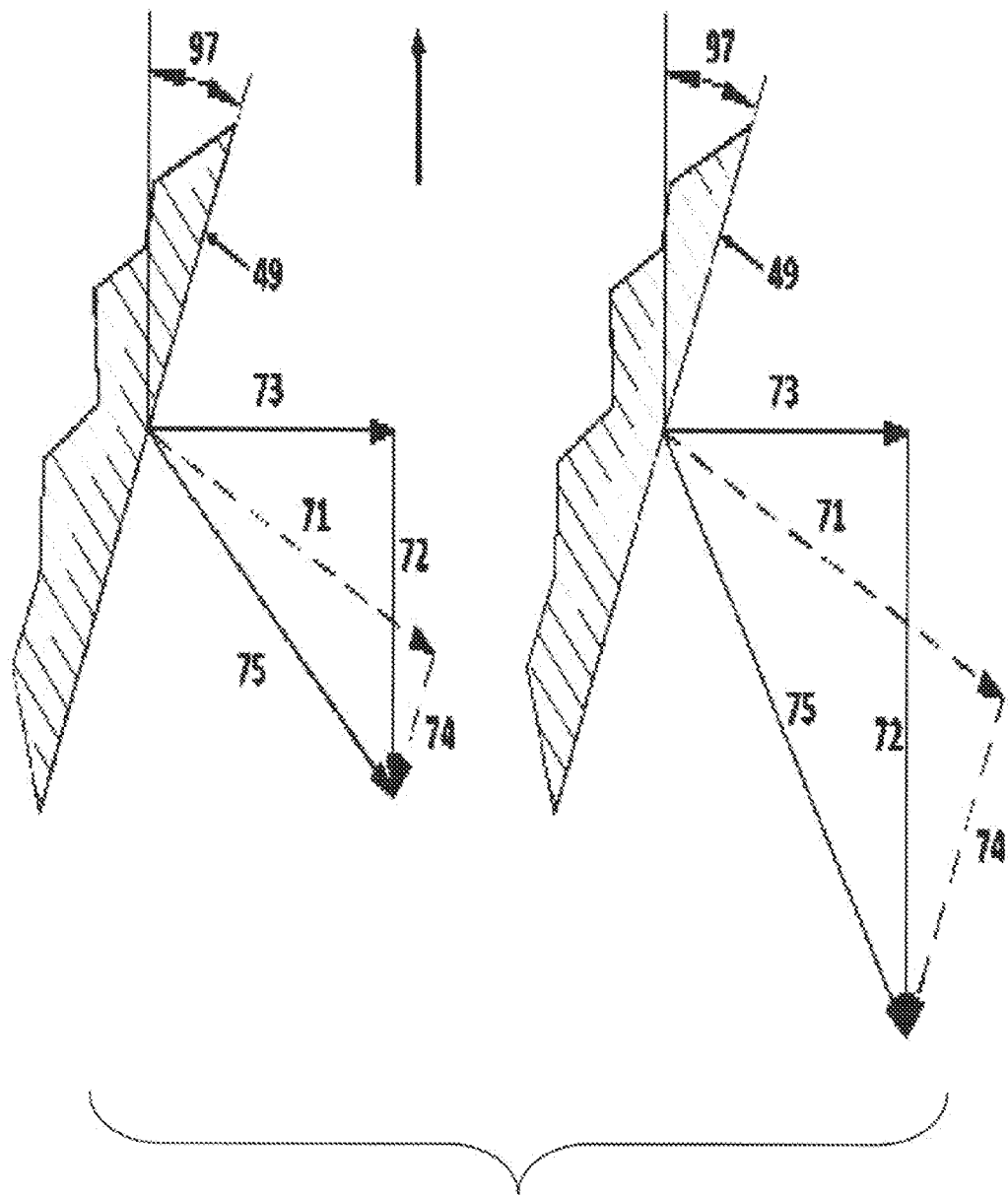
FIG. 13 shows the effect of friction between the split-tongue flexible arm nub and the mating groove entry region on the force components in FIG. 12 when the split tongue is moving into its mating groove.

FIG. 13, shows the effect of friction on the forces acting on said left flexible arm nub by said converging groove sidewall 49 of the mating groove entry region. Force vector 71 is the nub force vector component normal to surface 49; force vector 74 is the associated friction force vector; and force vector 75 is the resultant force act on the nub. As was done in FIG. 12, the resultant force vector 75 is decomposed into a two orthogonal force component vectors: a force vector component 73 responsible for the flexible arm deflection, and a force vector component 72 resisting entry of the nub into the groove.

The left detail in FIG. 13 corresponds to a friction coefficient of 0.3. Since there are two flexible arms 37 and 38 on split-tongue 36, the force resisting entry of said split-tongue into said groove entry region is twice the magnitude of force component 72 in FIG. 13 and corresponds to Point B in FIG. 18, and has a magnitude that is −1.782 times the magnitude of the force component 73 deflecting the split-tongue flexible arm. Said force resisting entry of the split-tongue into said groove entry region has a force magnitude 91% greater than the force magnitude resisting entry of the split-tongue into the groove in FIG. 12

The right detail in FIG. 13 corresponds to a friction coefficient of 0.6. The force component resisting entry of the split-tongue into the mating groove entry region corresponds to Point C in FIG. 18 and has a magnitude that is −2.961 times the magnitude of the force 73 deflecting the split-tongue flexible arm. This force magnitude is 217% greater than the force magnitude of corresponding force component 72 resisting entry of the split-tongue into the mating groove entry region in FIG. 12.

Figure 14:
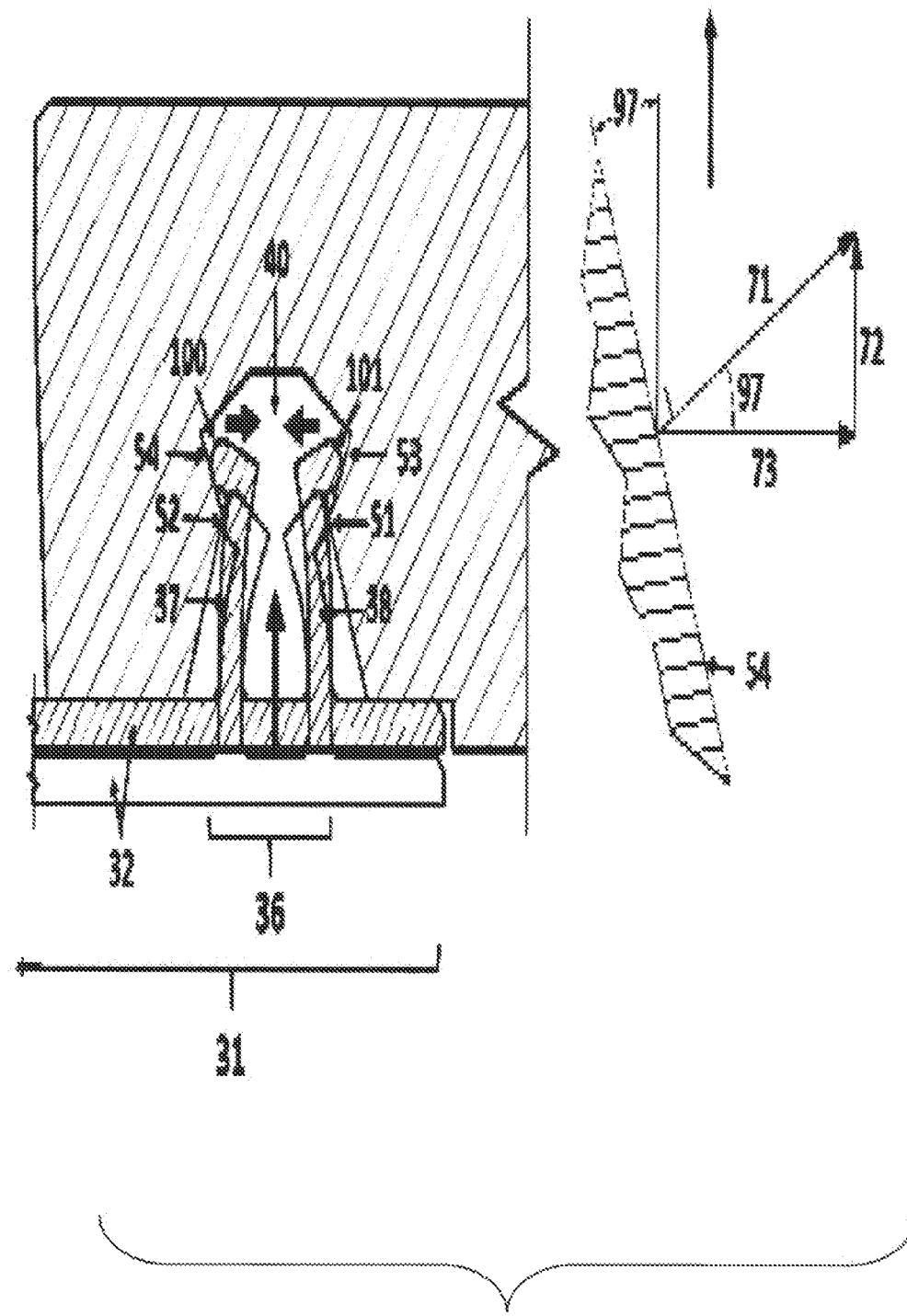
FIG. 14 shows the force components acting on a split-tongue flexible arm nub due to the interaction of the nub with the groove hold region as a normal connector moves into its mating groove in the absence of friction.

The mechanical interaction between the hold region diverging groove sidewalls and the split-tongue flexible arms is an important feature of the present connector system. The left detail in FIG. 14 shows the right side of a normal connector 31 with split-tongue 36 protruding upward from base support 32, as said split tongue moves into its mating groove 40, in the direction of the vertical arrow, from said apex-location (shown by the unshaded connector outline) to the fully-inserted-location (shown by the shaded connector outline) where the left and right nubs 100 and 101 respectively contact left and right hold region diverging sidewalls 54 and 53 respectively of said mating groove. In this detail, the hold region left and right diverging sidewalls, 54 and 53, respectively, of mating groove 40 act to reduce the inward deflection of the left and right flexible arms 37 and 38 of split-tongue 36) as connector element 31 moves into mating groove 40.

The right detail of FIG. 14, shows in vector format, and in the absence of sidewall-to-nub friction, the force 71 and the force components 72 and 73 imposed on the left flexible arm 37 of split-tongue 36 via nub 100 when said nub is in contact with diverging sidewall 54 of said mating groove diverging hold region. In the absence of friction, the force 71 is, of necessity, normal to the groove left sidewall surface 54. Since said left sidewall surface corresponds to the hold region of said groove, angle 97 is positive and corresponds to a diverging channel. The force vector 71 acting on the nub is shown decomposed into two orthogonal vector components: a vertically directed force component 72 acting in the direction of tongue insertion, and a horizontally directed force component 73 acting normal to the direction of tongue insertion. Force 73 is the force responsible for the inward deflection of the split-tongue left flexible arm 37. Force component 72 acts in the direction of split-tongue insertion and, hence, tends to aid entry of the split-tongue 36 into mating groove 40.

Since, in the right detail of FIG. 14, the entrance resisting force component 72 acts only on left nub 100 of flexible arm 37 of split-tongue 36, and since said split-tongue has a second, essentially identical, flexible arm 38, the total force resisting insertion of said split-tongue into said mating groove is twice the magnitude of force 72. For a sidewall angle, 97, value of +25° and zero nub-to-sidewall friction, the force aiding insertion of the split-tongue into the groove is 0.933 times the force deflecting the split-tongue flexible arm; and corresponds to Point D in FIG. 18. The arm deflection force 73 is maximum at said apex-location and decreases monotonically as the split-tongue moves from that location to said fully-inserted-location. Consequently, the frictionless force aiding split-tongue insertion of the split-tongue similarly decreases monotonically from a maximum force value at the apex-location to a lessor force value as the fully-inserted-location.

Figure 15:
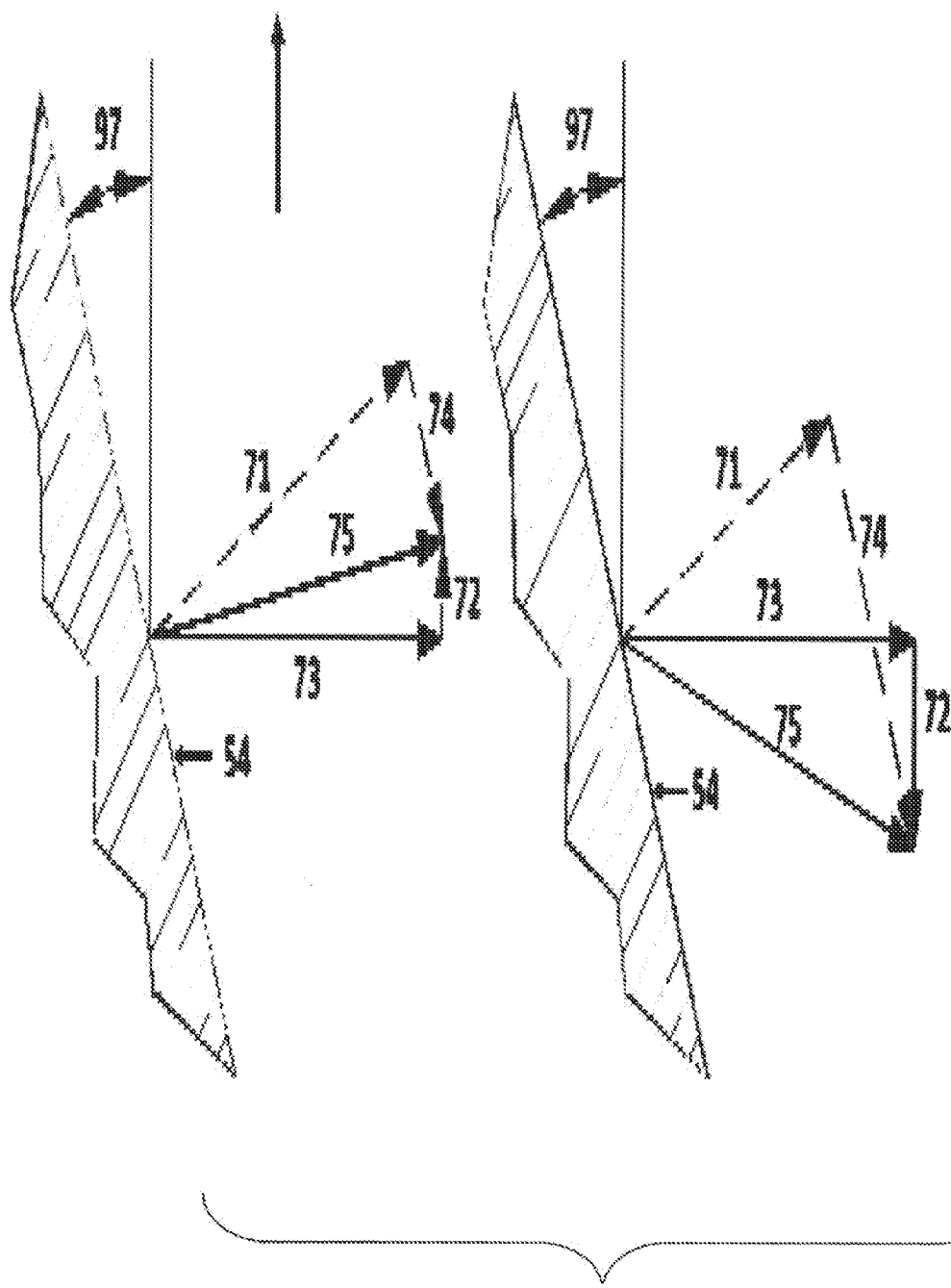
FIG. 15 shows the effect of friction between the split-tongue flexible arm nub and the mating groove hold region on the force components in FIG. 14 when the split tongue is moving into its mating groove.

FIG. 15, shows the effect of friction on the forces acting on said left flexible arm nub by said diverging groove sidewall 54 of the said mating hold or diverging wall region. Force vector 71 is the nub force vector component normal to surface 54; force vector 74 is the associated friction force vector; and force vector 75 is the resultant force act on the nub. As was done in FIG. 14, the resultant force vector 75 is decomposed into a two orthogonal force component vectors: a force vector component 73 responsible for the flexible arm deflection, and a force vector component 72 aiding (or resisting) entry of the nub into the groove.

The left detail in FIG. 15 corresponds to a friction coefficient of 0.3. Since there are two flexible arms 37 and 38 on split-tongue 36, the force resisting entry of the split-tongue into said groove entry region is twice the magnitude of force component 72 in FIG. 15 and corresponds to Point E in FIG. 18, and has a magnitude that is 0.292 times the magnitude of the force component 73 deflecting the split-tongue flexible arm. Said force aiding entry of the split-tongue into said groove entry region has a force magnitude 31% smaller than the force magnitude aiding entry of the split-tongue into the groove in FIG. 14

The right detail in FIG. 15 corresponds to a friction coefficient of 0.9. (The 0.9 friction factor value was selected in this detail, rather than the corresponding value of 0.6 in FIG. 13, simply to make the diagram visually clearer.) The force component now resists entry of the split-tongue into the mating groove entry region corresponds to Point F in FIG. 18 and has a magnitude that is −0.611 times the magnitude of the force 73 deflecting the split-tongue flexible arm. The negative value in FIG. 18 indicates that the force resists entrance of said split-tongue into said mating groove.

Figure 16:
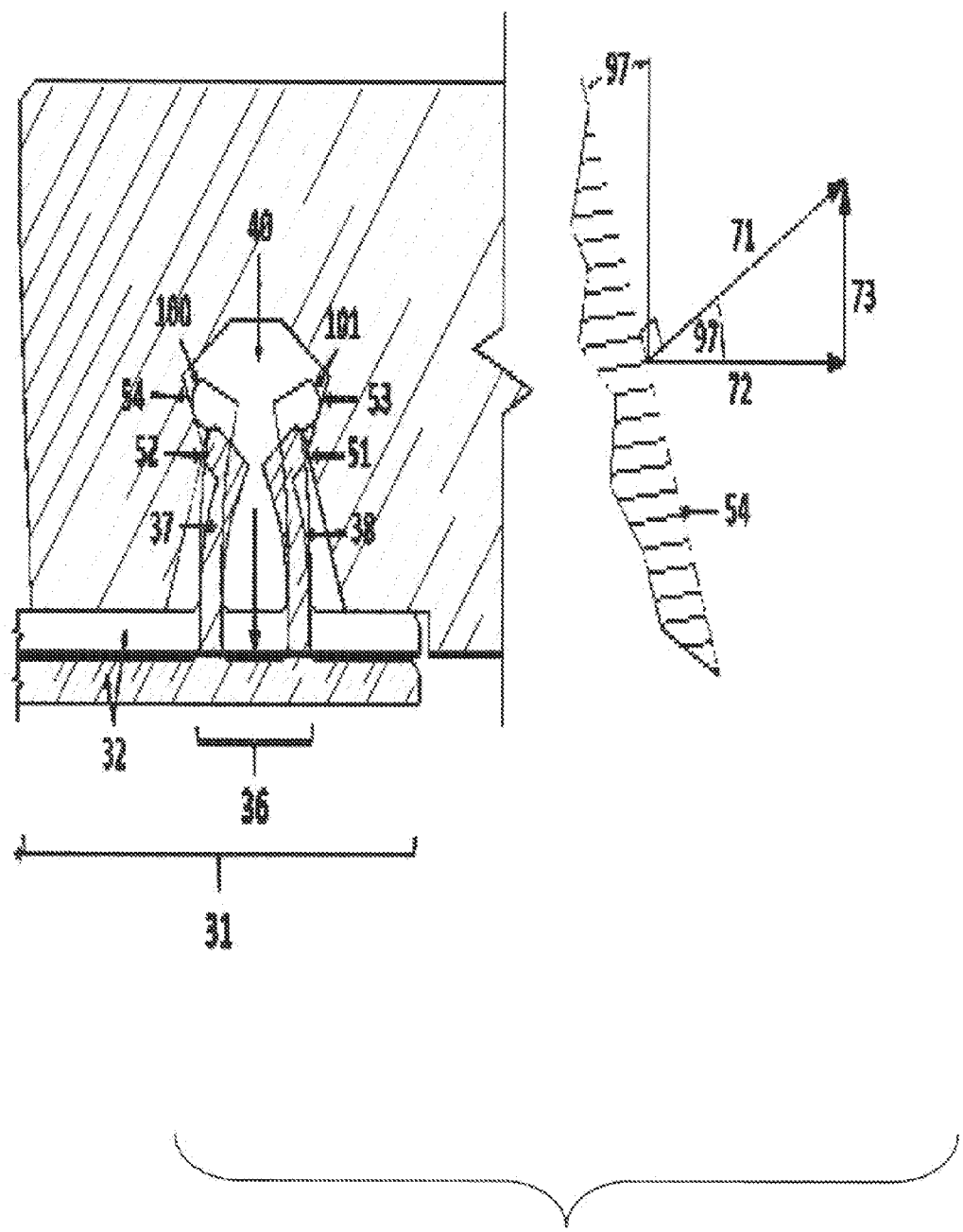
FIG. 16 shows the force components acting on a split-tongue flexible arm nub due to the interaction of the nub with the groove hold region as a normal connector moves out of its mating groove in the absence of friction.

The left detail in FIG. 16 shows the right side of a normal connector 31 with split-tongue 36 protruding upward from base support 32, as said split tongue moves out of its mating groove 40, in the direction of the vertical arrow, from its fully-inserted-location with left and right nubs 100 and 101 respectively, contacting the diverging sidewalls 54 and 53 location (shown by the unshaded connector outline) to the groove apex-location where said left and right nubs, respectively, are at left and right groove apex locations 52 and 51, respectively, of said mating groove (shown by the shaded connector outline). In the absence of friction the force acting on the flexible arm nub are independent of the direction of split-tongue motion. Hence the force diagram in the right detail is FIG. 16 is identical to that in the right detail of FIG. 14, and the force resisting retraction of the split tongue from the groove again corresponds to Point D in FIG. 18, and the magnitude of the force resisting removal of the split-tongue into the groove is 0.933 times the magnitude of the force deflecting the split-tongue flexible arm.

Figure 17:
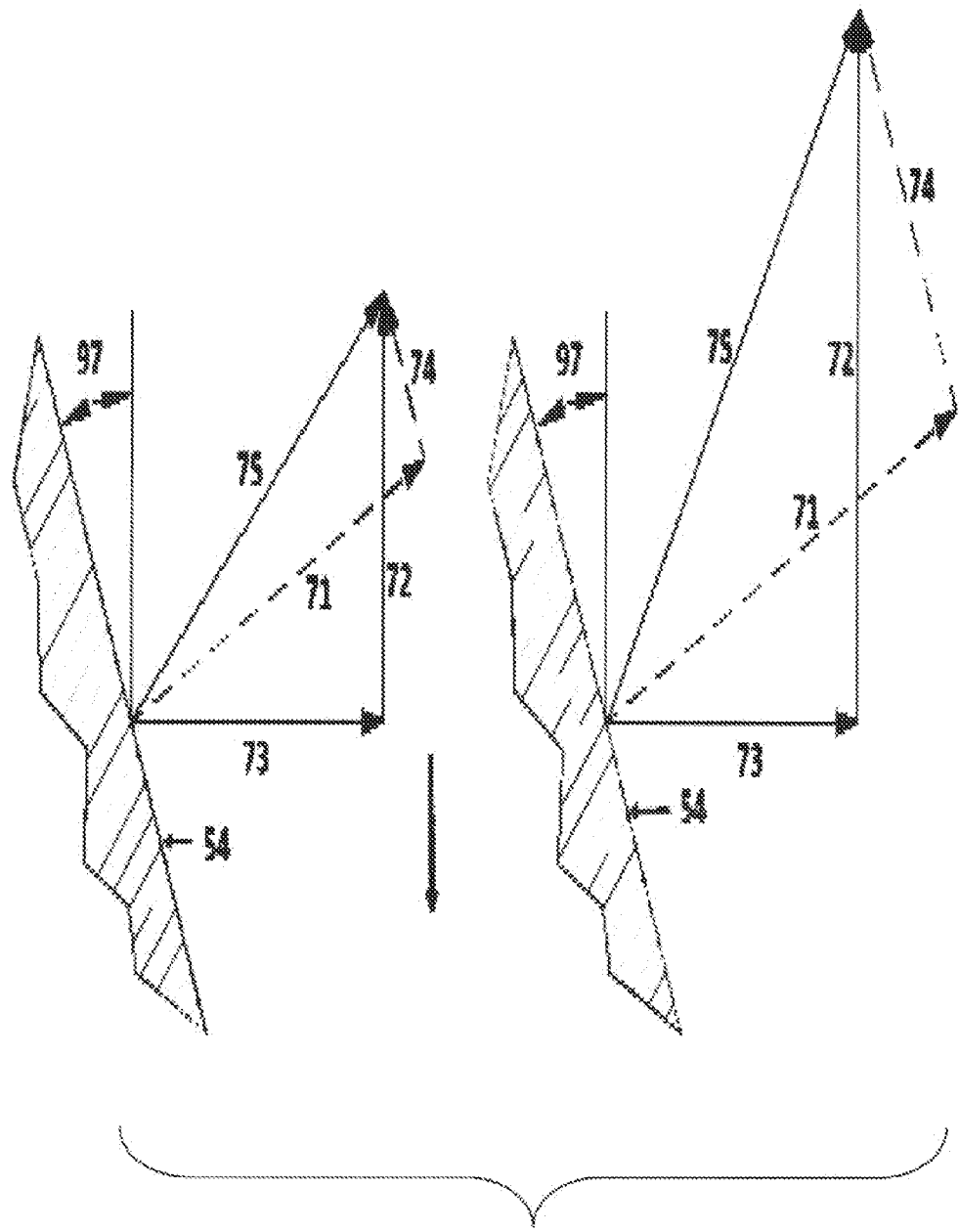
FIG. 17 shows the effect of friction between the split-tongue flexible arm nub and the mating groove hold region on the force components in FIG. 16 when the split tongue is moving out of its mating groove.

FIG. 17, shows the effect of friction on the forces acting on the right flexible arm nub as the split-tongue is retracted from the groove hold region. Force vector component 71 is the force vector normal to sidewall surface 54; force vector 74 is the associated friction force vector component; and force vector 75 is the resultant force vector acting on the nub. As was done in FIG. 16, the resultant force 75 is decomposed into two orthogonal force vector components: a force vector component 73 responsible for the flexible arm deflection, and a force component vector 72 aiding or resisting entry of the nub into the groove.

The left detail in FIG. 17 corresponds to a friction coefficient of 0.3. The force resisting retraction of the split-tongue into the groove corresponds to Point G in FIG. 18 and has a magnitude that is 1.782 times the magnitude of the force vector component 73 required to deflect the flexible arm. This force magnitude is 1.91 times greater than the magnitude of corresponding force vector component 72 in FIG. 16. The right detail in FIG. 17 corresponds to a friction coefficient of 0.6. The force resisting entry of the split-tongue into the groove corresponds to Point H in FIG. 18 and has a magnitude that is 2.961 times the magnitude of the force 73 required to deflect the flexible arm. This force magnitude is 217 times greater than the magnitude of the corresponding force component 72 in FIG. 16.

Figure 18:
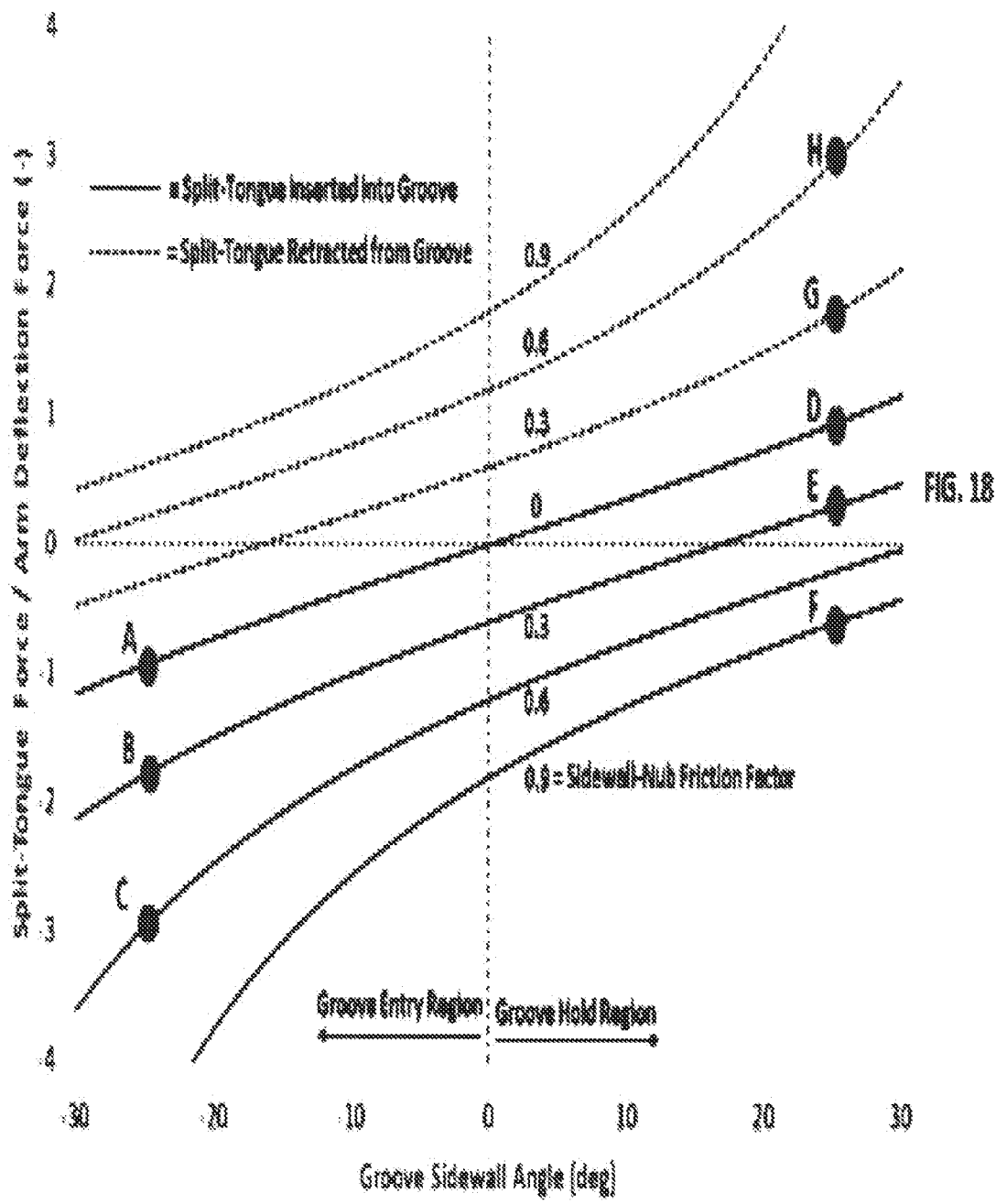
FIG. 18 is a plot of the ratio of split-tongue force to arm displacement-force as a function of groove sidewall angle for different values of nub to ramp friction factor when the split-tongue is moving into or out of its mating groove.

FIG. 18 is a plot of the ratio of the split-tongue force component in the split-tongue insertion direction to flexible arm deflection force as a function of groove sidewall angle, nub-to-sidewall friction factor, and the direction of split-tongue motion relative to the groove. A positive value corresponds to a force component aiding split-tongue insertion or resisting split-tongue retraction. A negative value corresponds to a force component resisting split-tongue insertion or aiding split-tongue retraction. A negative groove sidewall angle corresponds to the groove entry or converging sidewall region and positive groove sidewall angle corresponds to the groove hold or diverging sidewall region. The solid curves in the figure correspond to the split-tongue moving into the groove and the dashed curves correspond to the split-tongue moving out of the groove.

For a zero friction factor the force ratio is independent of the motion of the split-tongue relative to the groove and the corresponding curve is shown solid. In this special case the force ratio depends only on the groove sidewall angle and is positive when the sidewall angle is positive (i.e., sidewalls diverging), and is negative when the sidewall angle is negative (i.e., sidewalls converging)

The actual split-tongue insertion or retraction force is obtained from FIG. 18 by multiply the above split-tongue force ratio by the flexible arm deflection force. The latter force depends on:
1. Connector geometry (e.g., flexible arm thickness to flexible arm length)
2. Connector material properties (e.g., flexural modulus)
3. Flexible arm deflection (as limited by the connector material bending yield strength)

Consequently, it is clear that the split-tongue force, in addition to depending on the parameters shown explicitly in FIG. 18 (i.e., the side-wall angle, friction factor, and direction of split-tongue motion relative to the groove), also depends on the connector geometry and material properties. The latter two factors mean that the connector system insertion and retraction forces can be changed simply by changing the connector material or geometry and without any corresponding changes to the groove geometry.

In FIG. 18, Point A corresponds to the right detail in FIG. 12 and Points B and C correspond to the left and right details of FIG. 13 respectively; Points D corresponds to right detail in FIGS. 14 and 16, and Points E and F correspond to the left and right details of FIG. 15 respectively; Points G and H correspond to the left and right details of FIG. 17 respectively.

The preferred embodiment of the connector system described above, is characterized by eleven features:
1. Split-tongues having two flexible arms.
2. Outward facing nubs at the distal end of each flexible arm.
3. A base plate with two split-tongues projecting in the same direction from its ends or projecting in opposite directions from its faces.
4. Base plate extensions on either end of the base plate
5. A mating groove consisting of a recess region, a converging entry region, a minimum width apex region, a diverging hold region, and a cap or termination region arranged sequentially in the direction of tongue insertion.
6. Hold region extension lines that pass with margin through the entrance region of the groove.
7. Contact between the flexible arms and the groove sidewalls occurring only at the distal end of the flexible arm nubs
8. Further full insertion motion of the split-tongue into the groove is prevented by contact of the split-tongue base plate with the mating groove recess region upper surfaces.
9. Significant nonzero full insertion residual deflection.
10. Insertion and hold region force components that can be changed by changing the convergence angle of the converging insertion region and the divergence angle of the diverging hold region respectively.
11. Insertion and hold region force components that can be changed by changing the connector geometric parameters (e.g., the ratio of thickness of the flexible arms to their length) or by changing its material parameters (e.g., the connector material flexural modulus).

Figure 19:
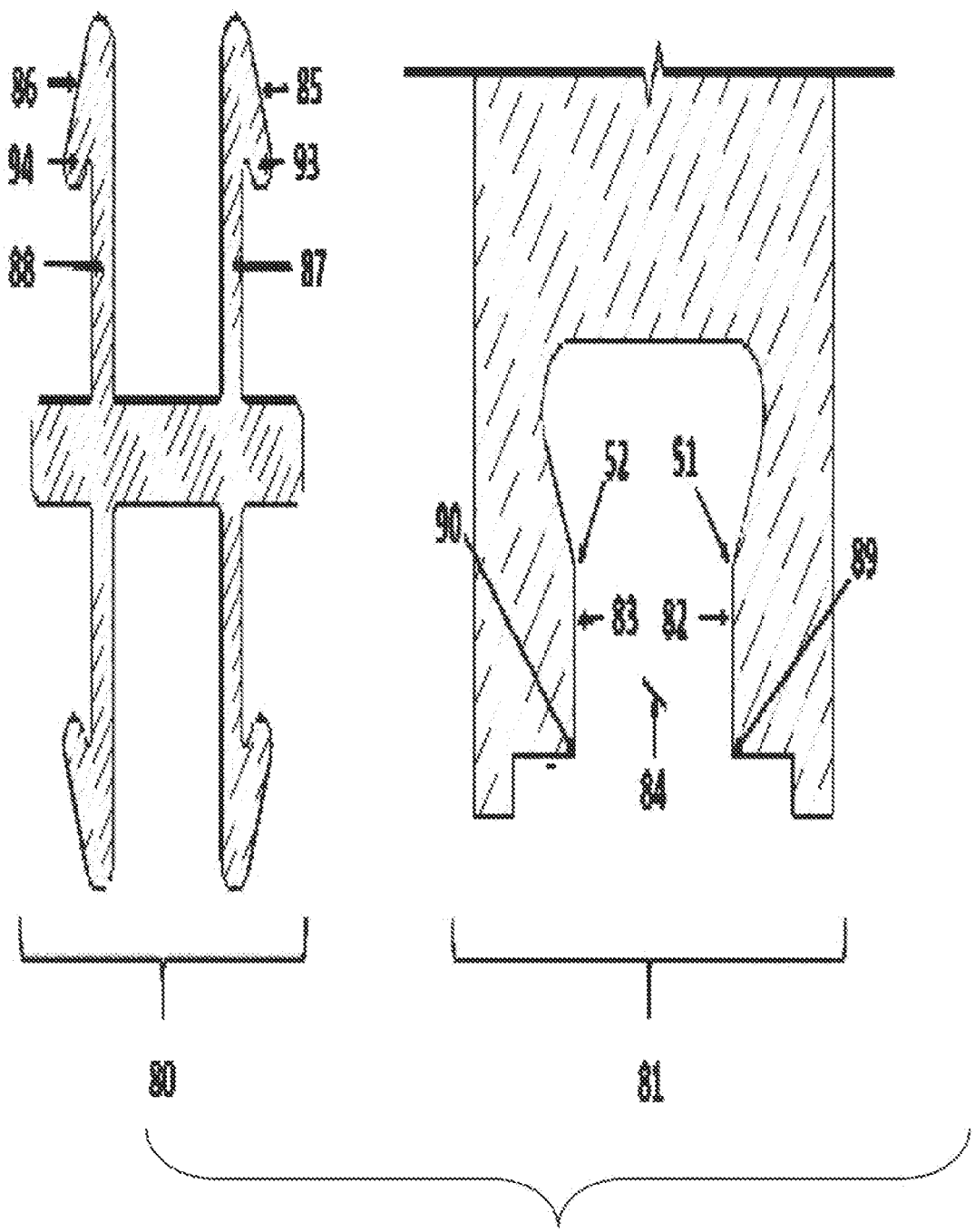
FIG. 19 shows an alternative connector and groove design.

FIG. 19 shows an alternate connector configuration 80 and an alternate mating groove configuration 81. In the left detail in FIG. 19, the right and left outward facing protruding nubs 93 and 94, respectively, at the distal ends of right and left flexible arms 87 and 8, respectively, are modified to form right and left insertion ramps 85 and 86 respectively. The presence of said insertion ramps, can be used to advantage to reduce the magnitude of convergence angle of the mating groove entry or converging sidewall region.

In the right detail in FIG. 19, the converging angle of the entry region of the mating groove is reduced to zero. In the preferred embodiments, the converging mating groove sidewalls 49 and 50 in FIGS. 6 and 7 act to deflect the split-tongue flexible arms inward during the initial stages of the split-tongue entry into its mating groove as shown in schematically in left detail in FIG. 12.

Figure 20:
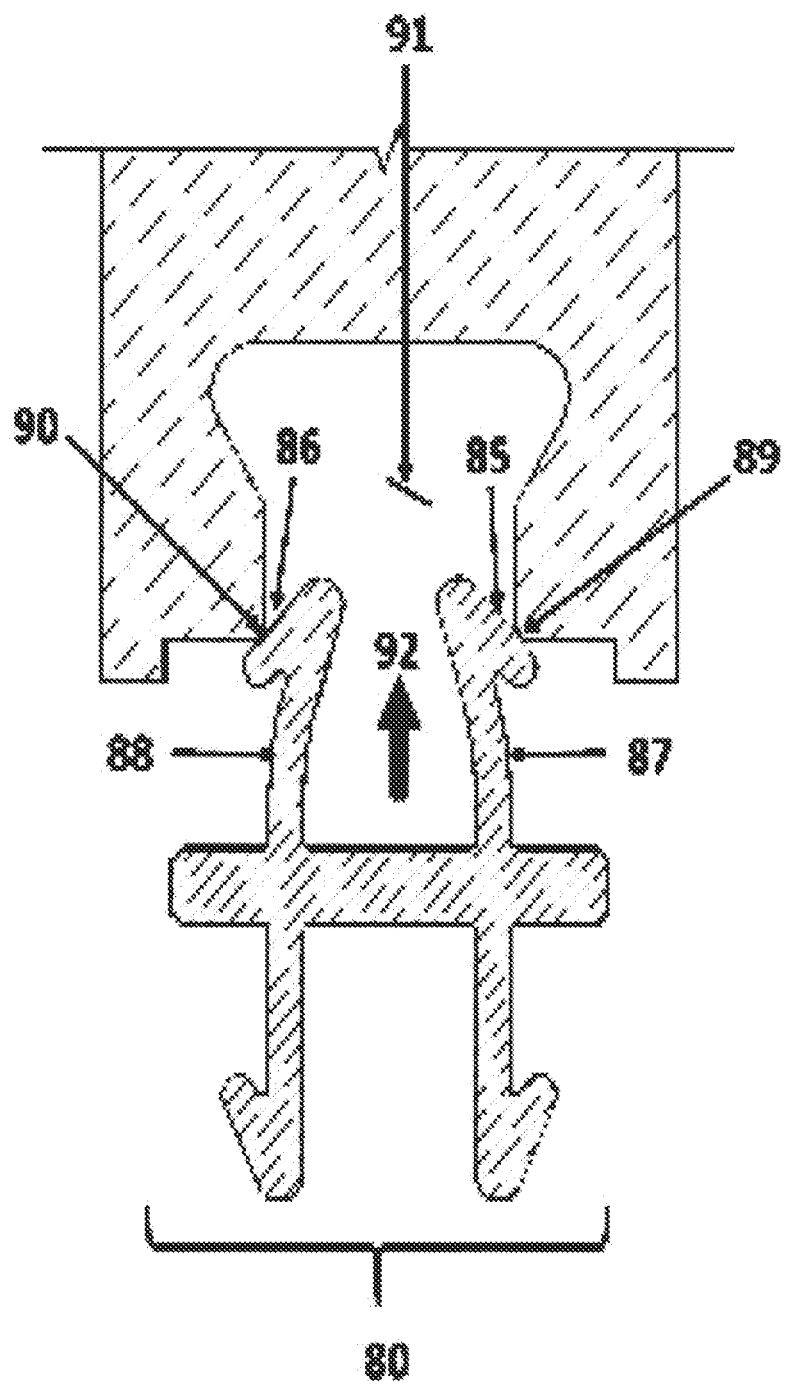
FIG. 20 shows the entry of the alternate connector into its mating groove.

As shown in FIG. 20, the inward deflection of the split-tongue arms during initial stages of split-tongue insertion into the groove is accomplished in the alternate connector configuration via the interaction of the right and left inlet corners 89 and 90, respectively, with the right and left entry ramps 85 and 86, respectively, as the split-tongue is moved in the direction of arrow 92.

Figure 21:
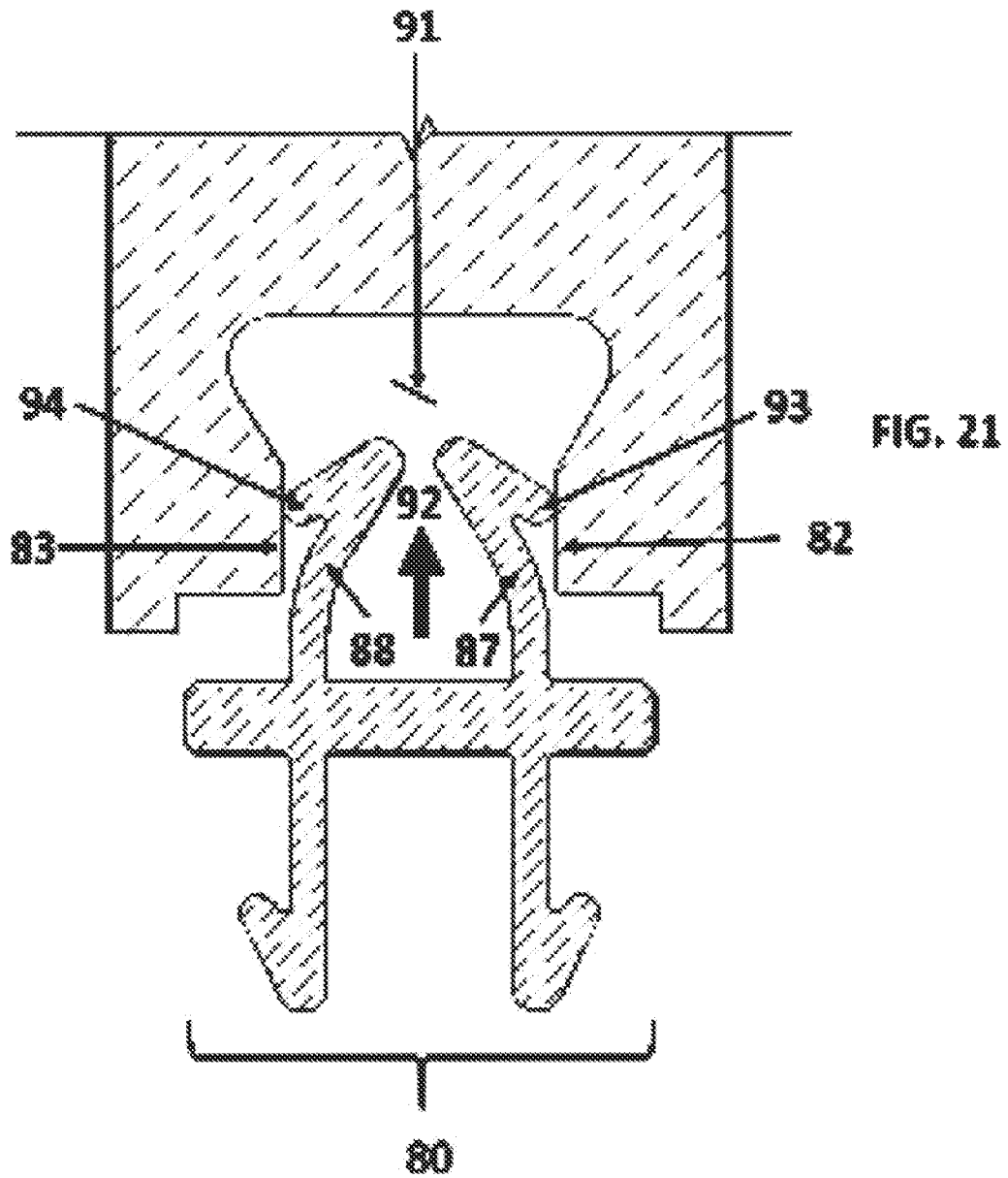
FIG. 21 shows the alternate connector at the condition of maximum arm deflection.

FIG. 21 shows the flexible arms 87 and 88 of alternate connector 80 at maximum inward deflection in. At this condition, flexible arm nubs 93 and 94 ride along the parallel sidewall surfaces 82 and 83 of groove 91. Motion of connector 80 in the direction of insertion arrow 92, at this point is hindered only by friction between nubs 93 and 94 and sidewall surfaces 82 and 83.

FIG. 22 shows the split-tongue comprising flexible arms 87 and 88 of alternate connector 80 fully inserted into its mating groove. In this condition nubs 93 and 94 interact with the diverging sidewalls 53 and 54 of groove 91 so as to generate a force component that tends to draw connector 80 into the groove. Further entrance of connector 80 into groove 91 is prevented by contact of base plate extensions 45 and 46 with the recess region upper surfaces 95 and 96 respectively of the mating groove 91.

In FIG. 12 the inward deflection of the split-tongue flexible arms 37 and 38 as the split-tongue moves into its mating groove 40 is accomplished solely by the action of the mating groove entry region converging sidewalls 50 and 51 on the split-tongue flexible arm nubs 100 and 101. In FIG. 20, the inward deflection of the split-tongue flexible arms 87 and 88 as the split-tongue is inserted into its mating groove 91 is accomplished solely by the action of the inlet corners 89 and 90 on the nub entry ramps 85 and 86. In FIG. 20 the convergence angle of the mating groove entry region is zero, and the entry region sidewalls 82 and 83 are parallel.

It clear that an intermediate structure between that shown in FIG. 12 and that shown in FIG. 19 can be had in the entry region sidewall convergence angle is less than that shown in FIG. 12 but greater than that shown in FIG. 19. In that case, as the split-tongue is inserted into its mating groove, an initial fraction of the total inward deflection of the split-tongue flexible arms is accomplished by the inlet corners 89 and 90 acting on the nub entry ramps 85 and 86 in a manner similar to that shown FIG. 20; followed by the remaining fraction of inward deflection being accomplished by the mating groove entry region converging sidewalls acting on the flexible arm outward facing nubs in a manner similar to that shown in FIG. 12.

In FIG. 19, the alternate connector is shown for a lateral connector configuration. A lateral connector is one whose two split-tongues, such as items 18 and 19 in FIG. 4 are formed on either side its base plate 20). As is the case with a lateral connector, its mating groove structure is shown fabricated into the side edge of the associated floor board as shown in FIG. 7. It is clear, however, that the same alternate split-tongue structure can just as easily be adapted to the normal connector shown in FIG. 5 and the mating groove integrated into the bottom surface of its associated floor board as shown in FIG. 6.

What is claimed is:

1. A connector system comprising
a connector element;
at least a first and a second structural element, each structural element having a first edge and a second opposite edge, and a corresponding mating groove that is formed in the structural elements extending from the first edge toward the second edge;
the connector element comprising a base plate with split-tongue elements protruding from said base plate, each split-tongue element designed to mate with one of said mating grooves and having flexible arms; said flexible arms having outward facing protruding nubs at their distal ends; each mating groove comprising five regions arranged sequentially from the first edge toward the second edge:
a recess region for receiving the base plate of the connector element when the connector element is inserted into the respective groove,
a converging entry region having sidewalls that converge toward one another, each side wall having an end,
a minimum groove width apex region at the ends of the converging sidewalls,
a diverging hold region having sidewalls extending away from one another, and
a cap or termination region;
said diverging hold region and said flexible arms and said nubs disposed such that contact of the nubs with said groove diverging region imposes significant residual arm deflection after the connector element is fully inserted in the mating groove such that the connector element is held in the respective groove.

2. The connector system of claim 1 wherein said residual arm deflection that is resultant from the contact of the nubs with said diverging region after the connector element is fully inserted in said mating groove results in a force being applied by the flexible arms to the diverging hold region.

3. The connector system of claim 1 wherein the force that is applied to the diverging hold region by said deflection of the flexible arms as a result of the contact between said arm nubs and said diverging region results in a force component tending to pull said connector split-tongue into said mating groove.

4. The connector system of claim 1 such that the extent of split-tongue insertion into said mating groove is limited by contact of said base plate and associated base plate extensions with said groove recess region.

5. The connector system of claim 1 wherein a force magnitude resisting entrance of said split-tongue into its corresponding mating groove can be increased or decreased by increasing or decreasing said converging angle of the converging entry region.

6. The connector system of claim 1 wherein a force magnitude resisting the removal of said connector element from said groove can be increased or decreased by increasing or decreasing said divergence angle of the diverging hold region.

7. The connector system of claim 1 wherein a force magnitude resisting entrance of said split-tongue into its corresponding mating groove can be increased or decreased by changing the geometric or material properties of the connector.

8. The connector system of claim 1 wherein a force magnitude resisting the removal of said split-tongue from its corresponding mating groove can be increased or decreased by changing the geometric or material properties of the connector.

9. The connector system of claim 1 wherein the connector element is extruded from an extrudable material.

10. The connector system of claim 1, wherein the connector element is extruded using a flat plate extrusion die.

11. The connector system of claim 1, wherein the connector element is with said split-tongues protruding in the same direction from the ends of said base plate.

12. The connector system of claim 1, wherein the connector element is with said split-tongues protruding in opposite directions from opposite faces of said base plate.

13. The connector system of claim 1 wherein the outward facing protruding nub at distal ends of the flexible arms are geometrically modified to allow reduction of the convergence angle of the converging entry region of the groove.

14. The connector system of claim 13 wherein said geometric modification for reducing the convergence angle of the converging entry region of the groove comprises an extension forming an outward facing insertion ramp.

15. The connector system of claim 1, wherein the hold region extension line exits the groove via the groove entrance.

16. The connector system of claim 1, wherein each groove is cut into the structural element via a tool whose maximum diameter is greater than the maximum distance between the groove sidewalls.

* * * * *